US012755134B2

(12) United States Patent
Beidas et al.

(10) Patent No.: US 12,755,134 B2

(45) Date of Patent: Oct. 6, 2026

(54) SPIKING NEURON CIRCUITS AND METHODS

(71) Applicant: Intel Corporation, Santa Clara, CA (US)

(72) Inventors: Alaa Beidas, Zahr el-Kanis (IL); Elan Banin, Raanana (IL); Assaf Ben-Bassat, Haifa (IL); Ofir Degani, Haifa (IL); Ashoke Ravi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 42 days.

(21) Appl. No.: 17/483,880

(22) Filed: Sep. 24, 2021

(65) Prior Publication Data

US 2023/0100670 A1 Mar. 30, 2023

(51) Int. Cl.
*G06N 3/049* (2023.01)
*G06N 3/063* (2023.01)

(52) U.S. Cl.
CPC ............. *G06N 3/049* (2013.01); *G06N 3/063* (2013.01)

(58) Field of Classification Search
CPC ............................... G06N 3/049; G06N 3/063
See application file for complete search history.

(56) References Cited

U.S. PATENT DOCUMENTS 11,607,548 B1 * 3/2023 Vallejo .................. A61B 5/316
2006/0036559 A1 * 2/2006 Nugent .................. G06N 3/082 706/23
2009/0287624 A1 * 11/2009 Rouat .................... G06N 3/049 706/26
2013/0204820 A1 * 8/2013 Hunzinger ............ G06N 3/049 706/25
2015/0359666 A1 * 12/2015 Zacharias .............. A61M 1/75 604/151
2018/0225564 A1 * 8/2018 Haiut ...................... G06N 3/08
2018/0260696 A1 * 9/2018 Suda ................... G11C 13/0002
2019/0311263 A1 * 10/2019 Kendall ................. G06N 3/065
2020/0320374 A1 * 10/2020 Cho ....................... G06N 3/049
2021/0064338 A1 * 3/2021 Emmart .................. H03M 7/24
2021/0244280 A1 * 8/2021 Blaauw ................ A61B 5/0006
2022/0006448 A1 * 1/2022 Kim ........................ H01L 23/00
2022/0314004 A1 * 10/2022 Nogaret ............ A61N 1/36514

OTHER PUBLICATIONS

Velichko Andrei, and Petr Boriskov. "Oscillator circuit for spike neural network with sigmoid like activation function and firing rate coding." arXiv preprint arXiv:1911.10351 (2019). (Year: 2019).*

* cited by examiner

*Primary Examiner* — Jennifer N Welch
*Assistant Examiner* — Quoc Ly Phu Phung
(74) *Attorney, Agent, or Firm* — VIERING, JENTSCHURA & PARTNER mbB

(57) ABSTRACT

Spiking neuron circuits and methods are provided in this disclosure. A spiking neuron may include a triggerable oscillator configured to generate an oscillator signal. The spiking neuron may further include a circuit configured to obtain an integration value based on received input spike signals. The spiking neuron may further include a leakage circuit configured to obtain a leakage value based on the oscillator signal. The spiking neuron may further include an oscillator activator configured to activate or deactivate the triggerable oscillator based on the leakage value and the integration value.

24 Claims, 12 Drawing Sheets

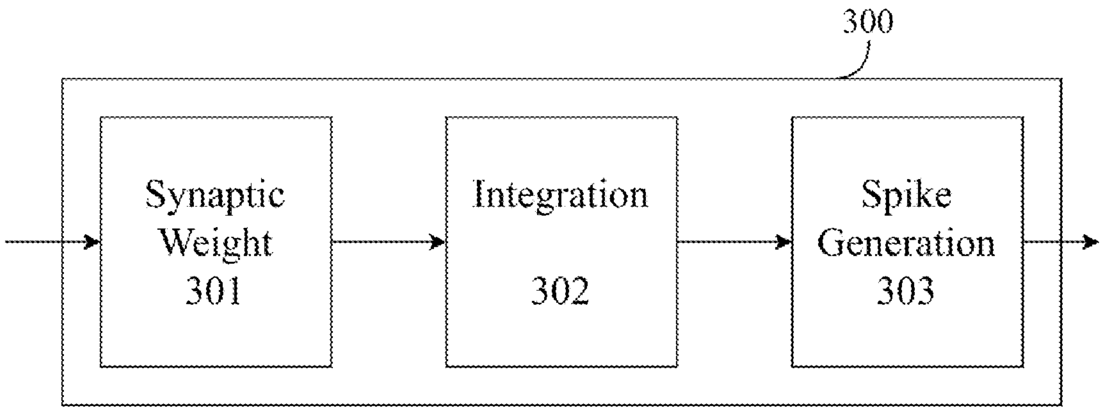
FIG. 3
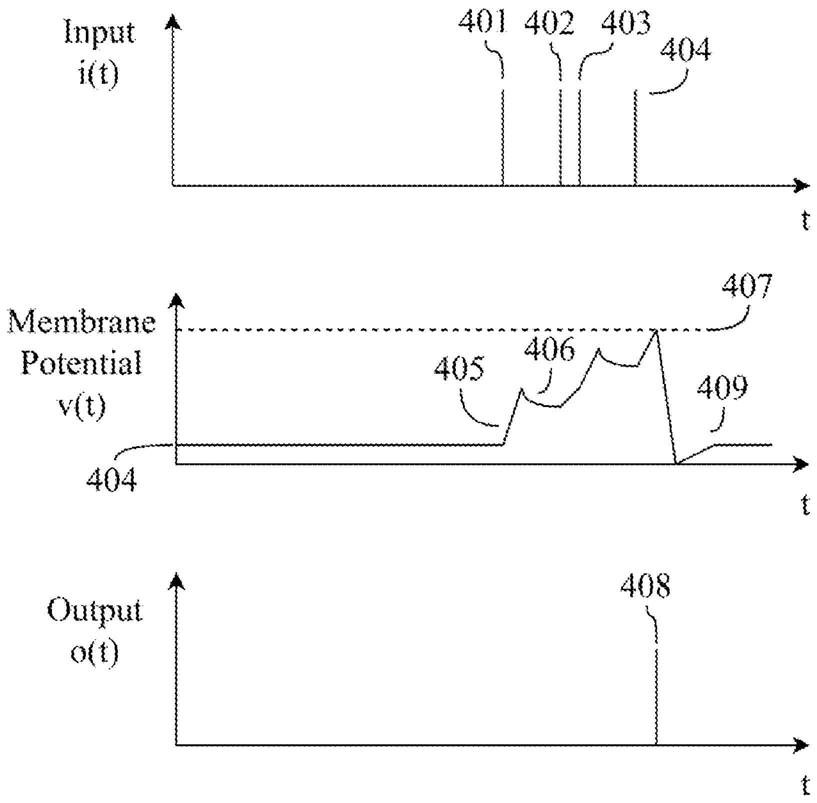
FIG. 4A
FIG. 4B
FIG. 4C

SPIKING NEURON CIRCUITS AND METHODS

TECHNICAL FIELD

This disclosure generally relates to spiking neuron circuits and methods.

BACKGROUND

Artificial neural networks (ANN) are computational models and systems that are inspired by the structure and functions of biological neural networks and they provide computation that is in a manner analogous to that of biological systems. Instead of traditional digital computation using zeros and ones, the artificial neural networks employ processing components that functionally resemble neurons of a biological brain. Artificial neural networks may include various types of electronic circuitry to physically realize the functions that are modeled on biological neurons as an alternative to traditional microprocessor implementation.

Spiking neural networks (SNN) include artificial neural networks that encode information using spikes via various methods such as rate encoding, or interval encoding. A spiking neural network (SNN) includes a network of spiking neurons, and each of the spiking neurons is configured to transmit a spike when the membrane potential of the spiking neuron reaches a predefined membrane potential threshold.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 3 shows schematically an example of an artificial neuron;

FIG. 4A, FIG. 4B, and FIG. 4C show illustrations of various electric signals related to a neuron circuit

DESCRIPTION

Figure 1:
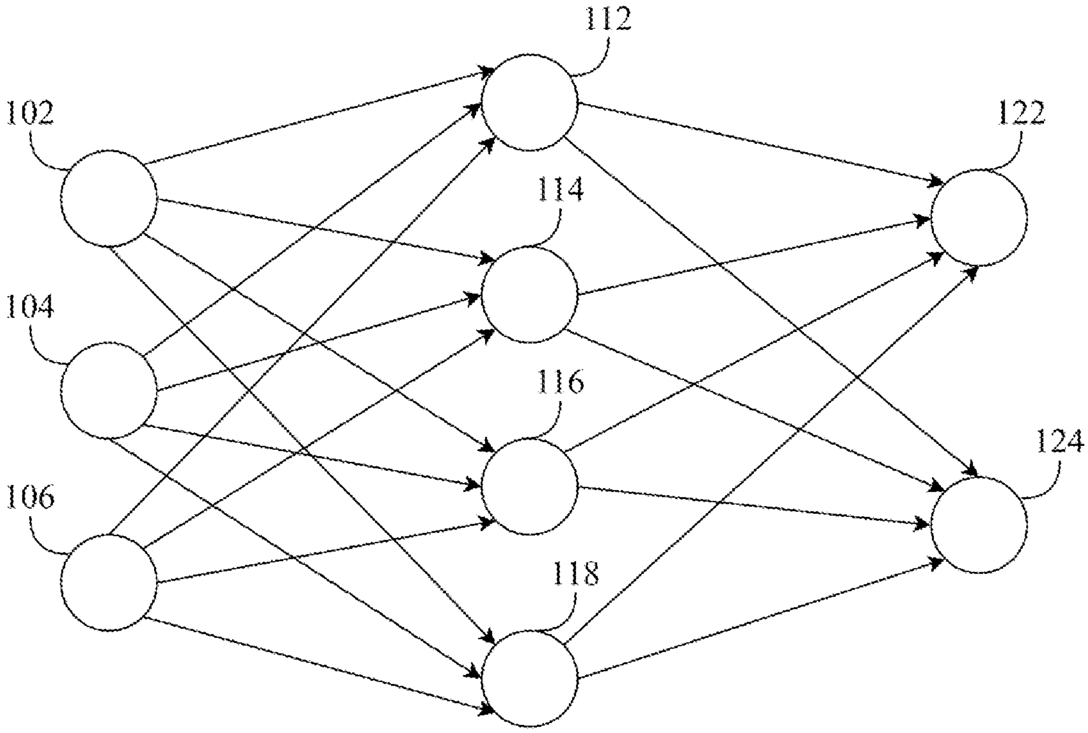
FIG. 1 shows an illustration of a plurality of neurons in a neural network.

The following detailed description refers to the accompanying drawings that show, by way of illustration, exemplary details and aspects in which aspects of the present disclosure may be practiced.

Traditional computing systems that are commonly used for general purposes depend on von Neumann architecture which includes a central processing unit that may include an arithmetic logic unit to perform mathematical operations and a control unit including registers, and a memory that may store data and instructions. The central processing unit and the memory are coupled to each other via a bus. Because the central processing unit is dependent on the data stored in the memory, the throughput of processing may be limited with the transfer rate of the bus between the central processing unit and the memory. When the central processing unit processes the data in the memory at a rate that is faster than the transfer rate of the bus, the central processing unit may simply wait for the data to arrive at its registers in an idle mode, decreasing the throughput of processing, and this concept may be referred as von Neumann bottleneck.

The above-mentioned limitation may be challenging in operations that may require the processing of data of great sizes, such as applications related to artificial intelligence, including deep learning and artificial neural networks. Alternatives architectures, such as graphics processing units that are specialized in various aspects including parallel processing in order to perform matrix calculations may provide a structure that may be suitable to support artificial neural networks, but there are still differences with respect to mechanisms of artificial neural networks, and such differences may result in inefficiencies and excessive power consumption.

Neuromorphic processors are designed in a manner that they are structured to mimic various aspects of biological brains. Neuromorphic processors may include a number of computing units that are referred to as artificial neurons that are connected to each other and they form a neural network in a manner that resembles biological neurons. The artificial neurons may communicate with each other using electrical signals that are formed as spikes in a time-dependent manner in a spiking neural network as mentioned above.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains fewer elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

As used herein, "artificial neuron" is understood as a processing element that is configured to perform a processing in a neural network. The artificial neuron may include various components, such as electronic circuits to provide operations mentioned in this disclosure. The electronic circuits may include analog circuits or digital circuits. The term "artificial neuron" and "neuron" are used in an interchangeable manner in this disclosure. The disclosure may include various examples that may specifically refer to neurons of a spiking neural network. However, it will be understood that these examples may also apply to other types of artificial neural networks. An artificial neuron may include a circuit.

As used herein, "spiking neuron" is understood as an artificial neuron suitable for a spiking neural network.

As used herein, "neural network" is understood as a network or circuit of neurons. The disclosure may include various examples that may specifically refer to spiking neural networks. However, it will be understood that these examples may also apply to other types of artificial neural networks.

FIG. 1 shows an illustration of a plurality of neurons in a neural network. The neural network may include a spiking neural network. The neural network may include a plurality of neurons 102, 104, 106, 112, 114, 116, 118, 122, 124. The neural network may be structured in layers as in a first layer including input neurons 102, 104, 106, an intermediate layer including intermediate neurons 112, 114, 116, 118, and an output layer including intermediate neurons 122, 124.

The terminology used as "input", "intermediate" and "output" are used only in order to refer to the corresponding neurons and/or layers that provide input and output to the neurons (or layer) 112, 114, 116, 118 illustrated in the middle layer. The input neurons 102, 104, 106 may be coupled to further neurons to receive input from the further neurons of another layer (e.g. a previous layer). The input neurons 102, 104, 106 may be neurons of an input layer of the neural network. Similarly, the output neurons 122, 124 may be coupled to further neurons to provide output to the further neurons of another layer (e.g. a following layer). The output neurons 122, 124 may be neurons of an output layer of the neural network. The elements that couple two neurons may also be referred as synapses.

The neural network may include further layers, and the layers (including the input layer, the output layer, and/or the middle layer) may include further neurons. The neurons may be grouped in a different manner, and/or one or more neurons of one of the layers may be configured to receive input only from a subset of a preceding layer. Similarly, one or more neurons of one of the layers may be configured to provide output only to a subset of a following layer.

In this example, each of the input neurons 102, 104, 106 are configured to couple each of the intermediate neurons 112, 114, 116, 118. Accordingly, each of the intermediate neurons 112, 114, 116, 118 may include 3 input fan-in connections. In other words, each of the intermediate neurons 112, 114, 116, 118 are configured to receive input from three neurons via synapses in-between. Each of the output neurons 122, 124 are configured to couple each of the intermediate neurons 112, 114, 116, 118. Accordingly, each of the output neurons 122, 124 may include 4 input fan-in connections. In other words, each of the output neurons 122, 124 are configured to receive input from four neurons via synapses in-between.

A first neuron that is immediately coupled to a second neuron via a synapse in a configuration that the first neuron provides an input to the second neuron may be referred to as a pre-synaptic neuron for the second neuron. A first neuron that is immediately coupled to a second neuron in a configuration that the first neuron receives an input from the second neuron via a synapse may be referred to as a post-synaptic neuron for the second neuron.

Accordingly, each of the input neurons 102, 104, 106 are pre-synaptic neurons for the intermediate neurons 112, 114, 116, 118. Each of the output neurons 122, 124 are post-synaptic neurons for the intermediate neurons 112, 114, 116, 118. The neural network may further include a plurality of pre-synaptic neurons that are coupled to the input neurons 102, 104, 106. The neural network may include a plurality of post-synaptic neurons that are coupled to the output neurons 122, 124.

Furthermore, each of the synapses (i.e. connections) that are configured to couple two of the neurons in the neural network may have a weight resembling synaptic weight which refers to the amount of influence that an input received from a pre-synaptic neuron has on a receiving neuron, similar to a biological neural network. The weight may be a scalar weight that may be adjustable. The neural network may be configured to adjust the weight of each of the synapses in order to resemble a learning mechanism, so that an input received from a first pre-synaptic neuron and an input received from a second pre-synaptic neuron may establish different influences on the receiving neuron, which the influence is adjusted through a learning process.

The weight of each of the synapses may be a scalar weight. The weight may include a weight of a positive value, which may be referred to as excitatory, resulting in an increase in the membrane potential of a receiving neuron. The weight may include a weight of a negative value, which may be referred to as inhibitory, resulting in a decrease in the membrane potential of a receiving neuron.

As indicated, each of the neurons 102, 104, 106, 112, 114, 116, 118, 122, 122 may further include a membrane potential that is specific to the neuron. The membrane potential may be a function that is dependent on time. The membrane potential of a receiving neuron may increase according to inputs received from pre-synaptic neurons. When the membrane potential of the receiving neuron reaches a certain level by the excitations from neurons that are pre-synaptic neurons to the receiving neuron, the receiving neuron fires (i.e. spikes) by providing input for one or more post-synaptic neurons.

Figure 2:
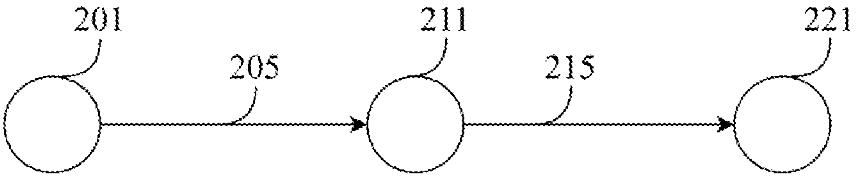
FIG. 2 shows an illustration including three neurons in a neural network.

FIG. 2 shows an illustration of three neurons in a neural network. The neural network as provided in FIG. 1 may include three neurons in a configuration that is depicted here (e.g. one of the input neurons, one of the intermediate neurons, and one of the output neurons). The illustration includes a first neuron 201, a second neuron 211, and a third neuron 221, a first synapse 205 that couples the first neuron 201 to the second neuron 211, and a second synapse 215 that couples the second neuron 211 to the third neuron 221.

When the first neuron 201 spikes, the second neuron 211 may receive the spike signal of the first neuron 201 as an input over the first synapse 205. The input spike signal which the second neuron 211 receives from the first neuron 201 may cause an adjustment to the membrane potential of the second neuron 211 according to a first weight that the first synapse 205 may provide. Accordingly, the membrane potential of the second neuron 211 may change over time based on input spike signals and the weight that the corresponding synapse provides.

Assuming that the second neuron 211 has not received any excitation for a period of time, the membrane potential of the second neuron 211 may be at a resting potential before the second neuron 211 receives the input spike signal. The neural network which includes the first neuron 201, the second neuron 211, and the third neuron 221 may further be configured in a manner that each of the neurons 201, 211, 221 may be configured to return to their membrane resting potential after a period of time that they receive an input spike signal. This behavior may be called "leaking" or "leakage" referring to the chemical leak of a biological neuron.

Accordingly, the second neuron 211 may be configured to decrease its membrane potential gradually over time. On the other hand, if the second neuron 211 receives a certain number of inputs that increase the membrane potential of the second neuron 211 over a membrane potential threshold, the second neuron 211 may output a spike signal (i.e. fires) to the third neuron 221 via the second synapse 215.

When the second neuron 211 spikes, the third neuron 221 may receive the spike signal of the second neuron 211 as an input over the second synapse 215. The input spike signal which the third neuron 221 receives from the second neuron 211 may cause an adjustment to the membrane potential of the third neuron 221 according to a second weight that the second synapse 215 may provide. Accordingly, the membrane potential of the third neuron 221 may change over time based on received input spike signals and the weight that the corresponding synapse provides. Similar to the mechanism of the second neuron 211, the third neuron 221 spike signals to further neurons when the membrane potential of the third neuron 221 is above the membrane potential threshold.

FIG. 3 shows schematically an example of an artificial neuron. The neuron 300 may be one of the neurons disclosed herein that may be modeled according to an integrate-and-fire model. The neuron 300 may include a synaptic weight block 301, an integration block 302, and a spike generation block 303 to provide various functions of an artificial neuron as provided in this disclosure. The neuron 300 may be based on, and/or may include, analog electrical circuits. The neuron 300 may be based on, and/or may include, digital electrical circuits to perform functions disclosed herein.

The synaptic weight block 301 may be coupled to a pre-synaptic neuron which is structurally and functionally similar to the neuron 300. The synaptic weight block 301 may be coupled to a plurality of pre-synaptic neurons. The synaptic weight block 301 may be configured to receive an input from one or more pre-synaptic neurons. The input that the neuron 300 receives from one or more pre-synaptic neurons may include a spike signal.

The synaptic weight block 301 may be configured to determine (and/or set, and/or define) how the input spike signal may influence the neuron 300, in particular, how the input spike signal may influence the integration block 302, which may be referred to as "weight" or "synaptic weight" in this disclosure. The weight that the synaptic weight block 301 determines may include a weight of positive value (excitatory). The weight that the synaptic weight block 301 determines may include a weight of negative value (inhibitory). The synaptic weight block 301 may apply the weight for the input spike signal.

The configuration of the synaptic weight block 301 may depend on the configuration of the integration block 302. As it is also indicated with respect to the integration block 302, the weights provided by the synaptic weight block 301 may indicate to the integration block 302 an amount of the adjustment that the integration block 302 may make to the value with respect to a predefined metric. The synaptic weight block 301 may determine the weight for the input spike signal and provide an indication related to the determined weight to the integration block 302, which the integration block 302 may use for the operation of the integration block 302. Furthermore, the synaptic weight block 301 may provide an indication of a presence of an input spike signal to the integration block 302. For example, the synaptic weight block 301 may provide an output signal to the integration block 302 based on the received input spike signal and the determined weight. The synaptic weight block 301 may be configured to provide the output signal to the integration block 302 when the synaptic weight block 301 receives an input spike signal, and accordingly, the integration block 302 may be configured to receive the indication of a received input spike signal and a determined weight for the received input spike signal.

The synaptic weight block 301 may determine the weight for the input spike signal and adjust at least one feature related to the input spike signal based on the determined weight and provide an electrical signal including the adjusted input spike signal to the integration block 302. The synaptic weight block 301 may provide an excitation to the integration block 302 with respect to the received input spike signal based on the determined weight in a manner in which the integration block 302 may determine the weight which the synaptic weight block 301 has set based on the excitation that the synaptic weight block 301 provides to the integration block 302. The synaptic weight block 301 may provide information indicating the determined weight to the integration block 302.

The synaptic weight block 301 may provide an indication related to the determined weight and/or a presence of an input spike signal a combination of various functions including the functions mentioned here. For example, the synaptic weight block 301 may include a pulse generator that is configured to generate one or more pulses based on a received input and a determined weight. The synaptic weight block 301 may provide the generated one or more pulses to the integration block 302. The generated one or more pulses may indicate a scalar determined weight. The synaptic weight block 301 may further provide information indicating whether the generated one or more pulses provided to the integration block 302 are of an excitatory nature or an inhibitory nature.

The synaptic weight block 301 may include, or may be coupled to, a memory configured to store information indicating a weight. Accordingly, the synaptic weight block 301 may determine the weight based on the information stored in the memory. Furthermore, the synaptic weight block 301 may be configured to determine different weights for a plurality of inputs that the synaptic weight block 301 is configured to receive input spike signals.

In other words, the synaptic weight block 301 may be configured to determine a first weight for an input spike signal that the neuron 300 receives from a first pre-synaptic neuron and a second weight for an input spike signal that the neuron 300 receives from a second pre-synaptic neuron. For example, the synaptic weight block 301 may include a memory (e.g. registers) to store information indicating a weight for each of the plurality of inputs. The synaptic weight block 301 may be configured to provide an output signal to the integration block 302, which the output signal may indicate the determined (stored) weight of an input when the synaptic weight block 301 receives an input spike signal from that input.

The integration block 302 may provide an integration function to the neuron 300, which may functionally include performing a uniting operation based on received input spike signals and the corresponding weights. There are various implementations to mimic the integration function provided by a biological neuron. The integration block 302 may perform certain operations based on a predefined metric to provide integration. As exemplarily shown in FIG. 4, the metric may be the voltage of an electrical signal, which may be referred as membrane potential similar to biological neurons. There are various types of metrics that the integration block 302 may use to provide an implementation to mimic the membrane potential of a biological neuron, such as information stored in a memory, using other attributes of electrical signals (e.g. current, frequency, phase, etc.), provided that the respective neuron is configured to provide an adjustment with respect to the metric based on the received input spike signals, and in particular with respect to their corresponding weights, and as a result, provide an output spike signal based on the adjustments with respect to the metric. The metric used by a neuron may be referred to as membrane potential sometimes in this disclosure.

When the neuron 300 has not received any input spike signal, or recently provided an output spike signal and has not received an input spike signal after the neuron 300 has provided the output spike signal, the value of the predefined metric tracked by the integration block 302 may be at a predefined resting value. The neuron 300 may provide an output spike signal in response to the value of the predefined metric reaching a predefined threshold. Received input spike signals may adjust the value of the predefined metric based on the corresponding weights for each of the received input spike signal. When the applied weight is an excitatory weight (i.e. when the input spike signal is excitatory), the integration block 302 may adjust the value of the predefined metric towards the predefined threshold according to the scale of the weight. When the applied weight is an inhibitory weight, the integration block 302 may adjust the value of the predefined metric towards the predefined resting value according to the scale of the weight. Furthermore, the integration block 302 may adjust the value of the predefined metric towards the predefined resting value according to a certain leakage rate. The integration block 302 may adjust the value of the predefined metric towards the predefined resting value according to the leakage rate in response to an oscillator signal (e.g. with each oscillation of the oscillator signal).

The integration block 302 may be configured to integrate based on an input received from the synaptic weight block 301. Accordingly, the integration block 302 may integrate for each of the input spike signals based on the weight that the synaptic weight block 301 indicates, and the integration block 302 may adjust the membrane potential based on the received input spike signal and the weight that the synaptic weight block 301 applies.

The integration block 302 may include a membrane potential storage that is configured to store the membrane potential and a membrane potential adjuster that is configured to adjust the membrane potential. The membrane potential storage and the membrane potential adjuster may include analog electrical circuits in a manner that is similar to a control of an electrical potential over electrical components, such as one or more transistors. The integration block 302 may include digital electrical circuits that are configured to store and adjust the membrane potential of the neuron 300 based on received input spike signals and the corresponding weights for each of the received input spike signals (e.g. an input received from the synaptic weight block 301).

The neuron 300 may have a membrane potential at a value of a resting membrane potential. The resting membrane potential may be zero, or a predefined value of a membrane potential. The resting membrane potential may be the membrane potential of the neuron 300 when the neuron 300 does not receive an input spike signal for a period of time. Based on an input which the integration block 302 may receive from the synaptic weight block 301 indicating at least a presence of an input spike signal, the integration block 302 may enter into another operation mode and adjust the membrane potential based on the input spike signal and the weight for the input spike signal. The integration block 302 may adjust (increase or decrease) the membrane potential with each input spike signal received over time based on their corresponding weights with respect to the inputs which the synaptic weight block 301 receives the input spike signals.

The integration block 302 may include a combiner (e.g. an adder) in order to combine the inputs received from the synaptic weight block 301, such as when the synaptic weight block 301 receives input spike signals simultaneously or within a predefined period of time. The combiner may be configured to perform a sum operation for the determined weight for the inputs that the synaptic weight block 301 has received an input spike signal. Accordingly, the synaptic weight block 301 may be configured to provide the output signal by indicating a sum of the determined weights of the inputs which the synaptic weight block 301 has received an input spike signal.

For example, the integration block 302 may include a digital counter that is coupled to the synaptic weight block 301. The digital counter may be configured to store the number of times which the digital counter receives an input (e.g. a pulse) from the synaptic weight block 301. The digital counter may be configured to increase (or decrease) when the synaptic weight block 301 provides an output of pulses based on a determined weight.

The integration block 302 may include an accumulator (e.g. a membrane potential accumulator) that is configured to add information indicating the determined weight that the integration block 302 receives from the synaptic weight block 301 in an accumulating configuration. The accumulator of the integration block 302 may be configured to receive the information indicating the determined weight which the synaptic weight block 301 provides. The received information may indicate the determined weight of one or more inputs (input spike signals).

Furthermore, the integration block 302 may include a leakage circuit that is configured to provide leaking resembling a leakage of a biological neuron. Referring to a biological neuron, the leakage function may decrease the membrane potential of the biological neuron towards the resting membrane potential of the biological neuron through chemical leaking. Accordingly, when the neuron 300 does not receive enough input spike signals having synaptic weights that would provide an increment to the membrane potential of the neuron 300 more than the decrement that the leakage function provides, the membrane potential of the neuron 300 falls back to the resting membrane potential. Alternatively, when the neuron 300 receives enough input spike signals having synaptic weights that would provide an increment to the membrane potential of the neuron 300 more than the decrement that the leakage function provides, the membrane potential may reach the membrane potential threshold and the neuron 300 may fire, but the neuron 300 may fire with a delay that is introduced to the neuron 300 by the leakage function.

Therefore, the leakage circuit may provide a leakage function in a conceptual manner, and the structure that is going to provide the leakage function may vary. As explained above, when the applied weight is an excitatory weight (i.e. when the input spike signal is excitatory), the integration block 302 may adjust the value of the predefined metric towards the predefined threshold according to the scale of the weight. When the applied weight is an inhibitory weight, the integration block 302 may adjust the value of the predefined metric towards the predefined resting value according to the scale of the weight. The leakage circuit may adjust the value of the predefined metric towards the predefined resting value according to a certain leakage rate. The integration block 302 may adjust the value of the predefined metric towards the predefined resting value according to the leakage rate in response to an oscillator signal (e.g. with each oscillation of the oscillator signal).

The leaking function may be any type of function that may affect the neuron 300 in a manner to introduce a delay to a period of time which begins with the neuron 300 receiving a first input spike signal changing the membrane potential from the resting membrane potential and ends with the neuron 300 firing, or in a manner to bring the neuron 300 back to its initial state.

For example, each neuron may have a plurality of operation modes, including a first operation mode (e.g. an initial operation mode) in which the neuron 300 has not received any input spike signal for a period of time. In the first operation mode, the neuron 300 may have its membrane potential at the resting membrane potential, as indicated above.

When the neuron 300 receives an input spike signal at an instance of time, the neuron 300 may start operating in a second operation mode in which the membrane potential of the neuron 300 changes from the resting membrane potential, or from the membrane potential of at the time instance if this is not the first spike signal that neuron 300 received for a period of time, towards the membrane potential threshold on which the neuron 300 will fire, and return to the first operation mode. Alternatively, if the neuron 300 does not receive enough input spike signals for a period of time the leakage function may bring the neuron 300 back to the first operation mode. Accordingly, the leakage function may include methods to bring the neuron 300 operating at the second operation mode back to the first operation mode, in particular, when the neuron 300 does not receive an input spike signal.

The leakage circuit may be configured to adjust the membrane potential that the integration block 302 stores in a manner to decrease the membrane potential over time. The leakage circuit may be configured to adjust the membrane potential when there is no input spike signal. The leakage circuit may be configured to adjust the membrane potential when the synaptic weight block 301 does not receive an input spike signal. The leakage circuit may be configured to adjust the membrane potential when the synaptic weight block 301 indicates to the integration block 302 that there is no spike signal. The synaptic weight block 301 may indicate that the synaptic weight block 301 does not receive an input spike signal by not providing an input to the integration block 302.

The leakage circuit may include an analog electrical circuit that is configured to generate a leakage current to decrease the membrane potential of the neuron 300. The leakage circuit may include a digital electrical circuit that is configured to adjust the membrane potential which the integration block 302 keeps. For example, the leakage circuit may be configured to provide an input to the counter which the integration block 302 keeps the membrane potential in a manner that the counter decreases the membrane potential with predefined decrements. The leakage circuit may be configured to provide the input to the counter periodically. The leakage circuit may be configured to provide input to the counter when there is no input spike signal.

The leakage circuit may be coupled to an oscillator that is configured to generate a signal with a predefined frequency. The oscillator may be coupled to the mechanism which the integration block 302 includes in order to keep the membrane potential in a manner that the generated oscillator signal provides a decrement to the membrane potential. For example, the accumulator, which the integration block 302 includes and which is configured to keep the membrane potential, may be configured to provide a predefined decrement to the accumulated membrane potential with each of the pulses of the generated oscillator signal.

Accordingly, the leakage circuit may adjust the membrane potential based on the oscillator signal. The leakage circuit may adjust the membrane potential based on the frequency of the oscillator signal. Accordingly, by adjusting the frequency of the oscillator signal, the leakage circuit may provide different adjustments to the membrane potential.

The spike generation block 303 may be configured to generate a spike signal to be transmitted to a post-synaptic neuron when the membrane potential of the neuron 300 reaches a membrane threshold of the neuron 300. The spike generation block 303 may include a comparator configured to compare the membrane potential of the neuron 300 and a predefined membrane potential threshold value. The spike generation block 303 may further include a pulse generator to generate a spike signal to be transmitted to the post-synaptic neuron. When the comparator determines that the membrane potential of the neuron 300 is over the predefined membrane potential threshold value, the comparator may trigger the pulse generator to generate a spike signal for the post-synaptic neuron.

In a second mode of operation, the neuron 300 may generate the spike signal with the spike generation block 303. Furthermore, when the membrane potential of the neuron 300 reaches the membrane threshold, or when the spike generation block 303 generates the spike signal, the spike generation block 303 resets the neuron 300 for another cycle of operation. The neuron 300 may reset the membrane potential by bringing the membrane potential to the resting membrane potential.

There are various methods with respect to a spiking neuron of a neural network, and in particular, with respect to the synaptic weight block 301, the integration block 302, and the spike generation block 303, and the disclosure above should be taken as exemplary and should be interpreted as functionally, as applicable, in order to realize a synaptic weight block 301 that is configured to weigh a received spike signal, an integration block 302 that is configured to keep track of membrane potential and adjust the membrane potential based on the weights of the received spike signals, and a spike generation block 303 that is configured to transmit a spike signal to a post-synaptic neuron when the membrane potential is over a predefined threshold.

FIG. 4A, FIG. 4B, and FIG. 4C show illustrations of various electric signals related to a neuron circuit. FIG. 4A shows input signals over time, which the neuron circuit may receive. FIG. 4B shows the membrane potential of the neuron circuit over time according to the received input signals in FIG. 4A. FIG. 4C shows the output signal of the neuron circuit over time according to the received input signals in FIG. 4A, and the membrane potential in FIG. 4B. The neuron circuit may be configured to operate according to a leaky integrate and fire model.

The neuron circuit may receive a first input spike signal 401, a second input spike signal 402, a third input spike signal 403, and a fourth input spike signal 404. The neuron circuit may receive each of the input spike signals 401, 402, 403, 404 from the same pre-synaptic neuron circuit, or from a plurality of synaptic circuits. For this example, the neuron circuit receives each of the input spike signals 401, 402, 403, 404 from a respective pre-synaptic neuron circuit. In other words, a first pre-synaptic neuron circuit provides the first input spike signal 401, a second pre-synaptic neuron circuit provides the second input spike signal 402, a third pre-synaptic neuron circuit provides the third input spike signal 403, and a fourth pre-synaptic neuron circuit provides the fourth input spike signal 404.

The neuron circuit may not have received any input spike signals before the first input spike signal 401, or the neuron circuit may not have received any input spike signals after the neuron circuit had fired an output spike signal and before receiving the first input spike signal 401. Accordingly, the membrane potential of the neuron circuit may be at a resting membrane potential 404 before receiving the first input spike signal 401.

The neuron circuit may receive the first input spike signal 401, and the membrane potential of the neuron circuit starts to increase 405 according to a first weight that the neuron circuit may determine for the first input spike signal 401. The neuron circuit may determine the first weight for the first input spike signal 401 according to the pre-synaptic neuron circuit which provides the first input spike signal 401 to the neuron circuit, which is the first pre-synaptic neuron circuit.

After the increase 405 of the membrane potential of the neuron circuit for the first input spike signal 401 according to the first weight, a leakage function (e.g. a leakage circuit) may introduce a decrement 406 on the membrane potential over time. The leakage function may be configured to adjust the membrane potential of the neuron circuit in order to bring the membrane potential to the resting membrane potential. The leakage function may be configured to operate when there is no input spike signal, which is depicted for a period of time between the first input spike signal 401 and the second input spike signal 402.

The neuron circuit may receive the second input spike signal 402, and the membrane potential of the neuron circuit may increase according to a second weight that the neuron circuit may determine for the second input spike signal 402. The neuron circuit may determine the second weight for the second input spike signal 402 according to the second pre-synaptic neuron circuit. The neuron circuit may receive the third input spike signal 403, and the membrane potential of the neuron circuit may increase according to a third weight that the neuron circuit may determine for the third input spike signal 403 in a similar manner as disclosed herein. As depicted here, since there is no input spike signal for a period of time between the third input spike signal 403 and the fourth input spike signal 404, the leakage function may provide another adjustment to the membrane potential over time.

The neuron circuit may receive the fourth input spike signal 404, and the membrane potential of the neuron circuit may increase according to a fourth weight. The membrane potential may reach a predefined membrane potential threshold 407. When the membrane potential reaches the predefined membrane potential threshold 407, the neuron circuit may output an output spike signal 408. The neuron circuit may be coupled to a plurality of post-synaptic neuron circuits to provide the output spike signal 408 to the plurality of post-synaptic neuron circuits.

Furthermore, the neuron circuit may enter into an operation mode in which the neuron circuit may reset its parameters to the initial mode of operation where the membrane potential is at the resting membrane potential 404. This period of time for reset may be referred to as the refractory period 409 of the neuron circuit. After the refractory period 409, the neuron circuit may have a membrane potential at the resting membrane potential 404, and the neuron circuit may be ready for another cycle of operation as disclosed herein. The refractory period 409 is a period of time that the neuron circuit is configured not to provide an output spike signal.

Figure 5:
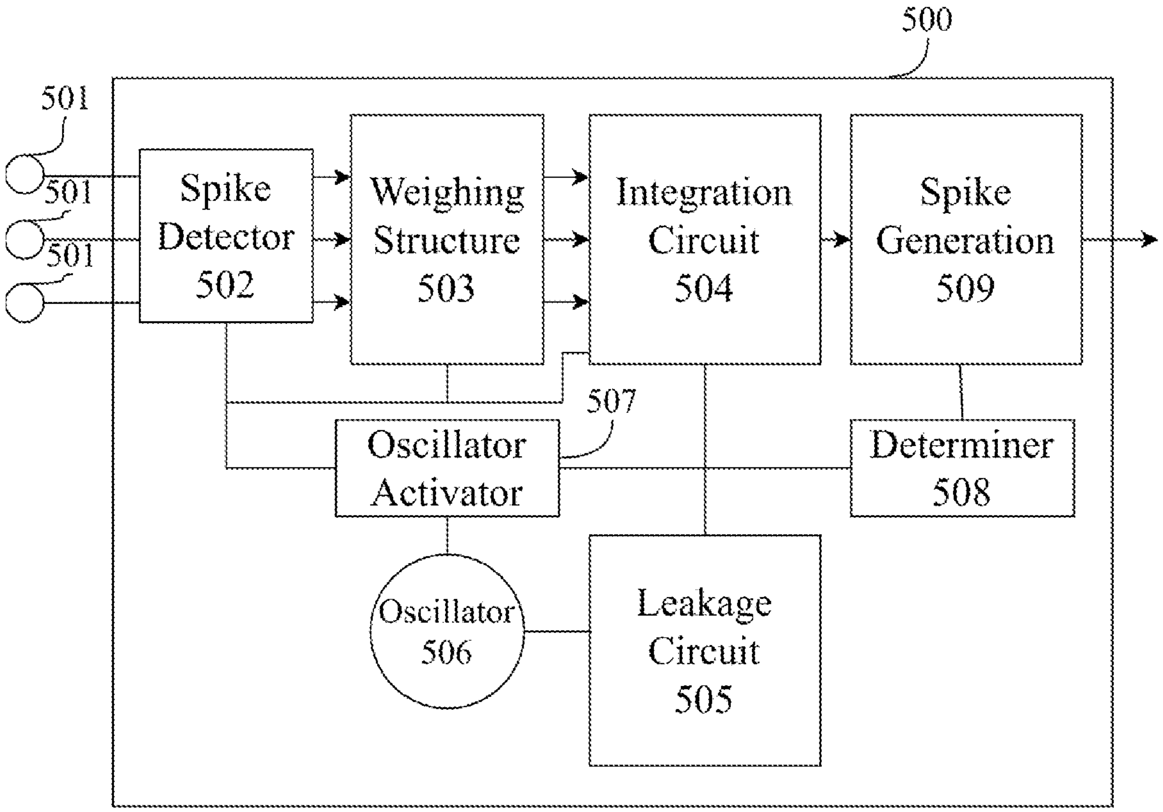
FIG. 5 shows schematically an example of a spiking neuron.

FIG. 5 shows schematically an example of a spiking neuron. The spiking neuron 500 may be an example of an artificial neuron as provided with respect to FIG. 3. The spiking neuron 500 may include a plurality of inputs. The plurality of inputs 501 may receive input spike signals from a plurality of pre-synaptic neurons. Although it is depicted in the drawing that the spiking neuron 500 includes three inputs 501, the spiking neuron 500 may include more than (or less than) three inputs 501 according to the fan-in input connection configuration of the spiking neuron 500.

The spiking neuron 500 may further include a spike detector 502. The spike detector 502 may detect received input spike signals from the plurality of inputs 501 and may provide a received spike indication indicating a received input spike signal from one or more of the plurality of inputs 501 to other components and/or circuits of the spiking neuron 500. The spike detector 502 may further provide a received spike input indication indicating one or more inputs from the plurality of inputs 501 of which have received an input spike signal.

The spike detector 502 may include any type of spike or pulse detector that may detect an input spike signal via various methods such as threshold-based detection. The spike detector 502 may include analog circuits or digital circuits that are configured to detect a spike signal. The spike detector 502 may include a plurality of spike detecting elements coupled to the plurality of inputs 501. The spike detector 502 may provide the above-mentioned indications in various manners.

The spike detector 502 may be coupled to another component and/or circuit via different signal paths corresponding to each of the plurality of inputs 501, and the spike detector 502 may provide an output signal (e.g. a pulse signal) to another component and/or circuit from the respective signal paths corresponding to one or more inputs from the plurality of inputs 501, which the spike detector 502 has detected an input spike signal to provide the received spike input indication. The spike detector 502 may include a trigger circuit that is configured to provide a trigger signal (e.g. a pulse signal) indicating detection of at least one received input spike signal from the plurality of inputs 502 at an instance of time to provide the received spike indication.

The spiking neuron 500 may further include a weighing structure 503 configured to apply a weight for a received input spike signal. The weighing structure 503 may implement functions of a synaptic weight block as disclosed according to FIG. 3. The weighing structure 503 may be configured to determine a weight for a received input spike signal. The weighing structure 503 may include, or may access via an interface, a memory to store weights (e.g. weight values) for received input spike signals. The memory may include a plurality of predefined weights for the plurality of inputs 501. The weighing structure 503 may receive the received spike input indication, select the weight for one or more inputs that have received an input spike signal from the memory, and provide an output indicating the selected weights.

Furthermore, the weighing structure 503 may be configured to provide the output indicating the selected weights in response to the received spike indication (i.e. the trigger signal). Accordingly, the weighing structure 503 may output weight indications for a plurality of received input spike signals for a period of time starting from a first received spike input indication indicating a received input spike signal from a first input and the output of the weighing structure 503. Accordingly, the trigger circuit that outputs the trigger signal may include a delay circuit to introduce a delay to define the period of time. The weighing structure 503 may be configured may determine the weights with a positive transition of a received spike indication and output the determined weights with a negative transition of the trigger signal.

The weighing structure 503 may include a plurality of weight releasing elements coupled to the plurality of inputs 501 to receive the received spike input indication. Each weight releasing element may include a memory to store a weight value for the respective input. The memory may include a register configured to store preferably 4 to 8 bits for the weight value of the respective input, although the capacity may depend on the weight resolution configured for the neural network. Each of the weight releasing elements may be configured to provide an output determined weight for the respective input in response to the trigger signal based on the received spike input indication received from the spike detector 502.

The spiking neuron 500 may further include an integration circuit 504. The integration circuit 504 may be configured to implement certain functions of the integration block as described in FIG. 3 to perform an integration based on the determined weights for the received input spike signals. The integration value may indicate a membrane potential (e.g. membrane potential value) at an instance of time for the spiking neuron 500.

The integration circuit 504 may be configured to receive the determined weights for the received input spike signals from the weighing structure 503. The integration circuit 504 may further perform a predefined mapping operation (e.g. a predefined function, a predefined mathematical operation) based on the received determined weights to obtain the integration value.

The integration circuit 504 may include an adder to perform a sum operation. The adder may perform the sum operation for the determined weights of each input that received an input spike signal. The adder may perform the sum operation for each of the determined weights that the adder received from the weighing structure 503 for the instance of time in which the weighing structure 503 provided the determined weights. The integration circuit 504 may further include other circuits to perform the predefined mapping operation to obtain the integration value indicating membrane potential of the spiking neuron 500.

The integration circuit 504 may further include a membrane potential circuit including an accumulator ("membrane potential accumulator"). The membrane potential accumulator may receive the sum of the determined weights from the adder. The membrane potential accumulator includes a memory to store an integration value indicating the integration value at a first instance of time. The membrane potential accumulator may add the sum of the determined weights which the membrane potential accumulator may receive at a second instance of time to the integration value at the first instance of time to obtain the integration value at the second instance of time. The membrane potential accumulator may perform the accumulation in response to the trigger signal.

The spiking neuron 500 may further include a leakage circuit 505. The leakage circuit 505 may be an example of the leakage circuit provided with respect to FIG. 3 to perform a leakage function for the spiking neuron 500. The leakage circuit 505 may be configured to obtain a leakage value for the spiking neuron 500. The leakage value may indicate a leakage amount for the spiking neuron 500 at an instance of time. The leakage circuit 505 may obtain the leakage value based on an oscillator signal which a triggerable oscillator 506 may generate.

The spiking neuron 500 may include the triggerable oscillator 506 to generate the oscillator signal, and an oscillator activator 507. The oscillator activator 507 may activate or deactivate the triggerable oscillator 506. The oscillator activator 507 may activate or deactivate the triggerable oscillator 506 in response to the received spike indication (e.g. trigger signal) and/or based on the leakage value and the integration value. The triggerable oscillator 506 may include a triggerable ring oscillator. The oscillator activator 507 may activate the triggerable oscillator 506 in response to the trigger signal. The oscillator activator 507 may deactivate the triggerable oscillator 506 based on the leakage value and the integration value. The triggerable oscillator 506 may include the oscillator activator 507.

The spiking neuron 500 may have an initial operation mode as indicated above, in which the spiking neuron 500 has not received any input spike, where the membrane potential (e.g. integration value) is at a predefined resting membrane potential and where the leakage amount (e.g. leakage value) is at a predefined initial leakage amount. The triggerable oscillator 506 may be in a deactivated configuration at this stage. The deactivated configuration of the triggerable oscillator 506 may include that the triggerable oscillator 506 may not provide an output oscillator signal at all, or the triggerable oscillator 506 may not provide the oscillator signal to the leakage circuit 505. As an alternative, the leakage circuit 505 may not receive the oscillator signal in the deactivated configuration of the triggerable oscillator 506.

When the spiking neuron 500 receives an input spike signal, the spiking neuron 500 may start to operate in a second operation mode as also explained above in response to a received input spike signal. The spike detector 502, in particular the trigger circuit, may send the received spike indication (e.g. trigger signal) to the oscillator activator 507. The oscillator activator 507 may activate the triggerable oscillator 506 in response to the trigger signal. Once the oscillator activator 507 activates the triggerable oscillator 506 in response to the trigger signal, the triggerable oscillator 506 may be configured to provide the oscillator signal to the leakage circuit 505 until the oscillator activator 507 deactivates the triggerable oscillator 506.

Based on the oscillator signal, the leakage circuit 505 may obtain the leakage value indicating the leakage amount at an instance of time. The leakage circuit 505 may be configured to adjust the leakage value at the instance of time with a predefined leakage rate value in response to the oscillator signal. The leakage circuit may be configured to adjust the leakage value with different leakage rates for a different instance of time to provide a non-linear effect. The leakage circuit may be configured to adjust the leakage value based on the integration value (e.g. as a mathematical function or a mapping operation including the integration value at an instance of time). The leakage circuit 505 may include various elements that are configured to receive the oscillator signal as a clock signal and perform the adjustment for each oscillation of the oscillator signal.

For example, the leakage circuit 505 may include an accumulator ("leakage accumulator") that is configured to adjust the leakage value in a similar manner to adjustment of the integration value by the membrane potential accumulator, but, in response to the oscillator signal. The leakage accumulator may accumulate the leakage value at a first instance of time by adding a predefined leakage rate value to the leakage value at a second instance of time (after the first instance of time) to obtain the leakage value at the second instance of time. A time period between the first instance of time and the second instance of time may be the period of the oscillator signal. Furthermore, the leakage circuit may perform further mapping operations to provide an adjustment (e.g. via bit-shifting, etc., a mapping operation including the integration value, based on a predefined transfer function/mapping operation of the integration value) based on the oscillator signal as provided in this disclosure to obtain the leakage value.

Based on the leakage value at an instance of time which the leakage circuit 505 obtains and the integration value which the integration circuit 504 obtains, the oscillator activator 507 may activate or deactivate the triggerable oscillator 506. The oscillator activator 507 may deactivate the triggerable oscillator 506 based on the leakage value and the integration value. The oscillator activator 507 may deactivate the triggerable oscillator 506 in case the leakage value is greater (or equal) than the integration value. Furthermore, the oscillator activator 507 may deactivate the triggerable oscillator 506 in case the integration value is above (or equal to) a predefined membrane potential threshold. The oscillator activator 507 may receive a signal from a determiner to activate or deactivate the triggerable oscillator 506.

The spiking neuron may further include a determiner 508. The determiner 508 may perform various comparisons to determine various results. In this example, the determiner 508 is shown as a separate entity, though any one of the circuits (e.g. integration circuit 504, the leakage circuit 505, or a spike generation circuit 509) may be coupled to, or include, the determiner 508. The determiner 508 may include a plurality of determiners.

The determiner 508 may determine activation or deactivation of the triggerable oscillator 506. The determiner 508 may determine to deactivate the triggerable oscillator 506 based on the integration value and the leakage value at an instance of time. The determiner 508 may compare the integration value and the leakage value. The determiner 508 may determine to deactivate the triggerable oscillator 506 in case the leakage value is greater (or equal to) the integration value. The determiner 508 may perform the determination with respect to the integration value and the leakage value based on the oscillator signal. Accordingly, the determiner 508 may output a reset signal to provide the indication.

Furthermore, the determiner 508 may determine to deactivate the triggerable oscillator 506 based on the integration value and a predefined membrane potential threshold value at an instance of time. The determiner 508 may compare the integration value and the predefined membrane potential threshold value. The determiner 508 may determine to deactivate the triggerable oscillator 506 in case the integration value is greater than (or equal to) the predefined membrane potential threshold value. The determiner 508 may perform the determination with respect to the integration value and the predefined membrane potential threshold value based on the trigger signal. In addition, the determiner 508 may further determine to deactivate the triggerable oscillator 506 in case the integration value is less than the predefined resting membrane potential, for example, to disregard an inhibitory effect of a first input spike signal which the spiking neuron 500 receives. Accordingly, the determiner 508 may output a reset signal to provide the indication. Furthermore, the determiner 508 may further output a firing indication to be provided to the spike generation circuit 509 which generates an output spike in response to the firing indication.

In response to a reset signal, the spiking neuron 500 may switch its operation mode to the initial operation mode. The integration circuit 504 may reset the integration value to the predefined membrane resting potential value. The leakage circuit 505 may reset the leakage value to the predefined initial leakage value. The weighing structure 503 may reset (or adjust based on a learning event) the weight values. The spiking neuron 500 may include a delay circuit to provide a delay for a period of time between the respective determination of the determiner 508 and the generation of the reset signal. Alternatively, a delay circuit may receive the reset signal to introduce a predefined delay for a refractory period.

Figure 6:
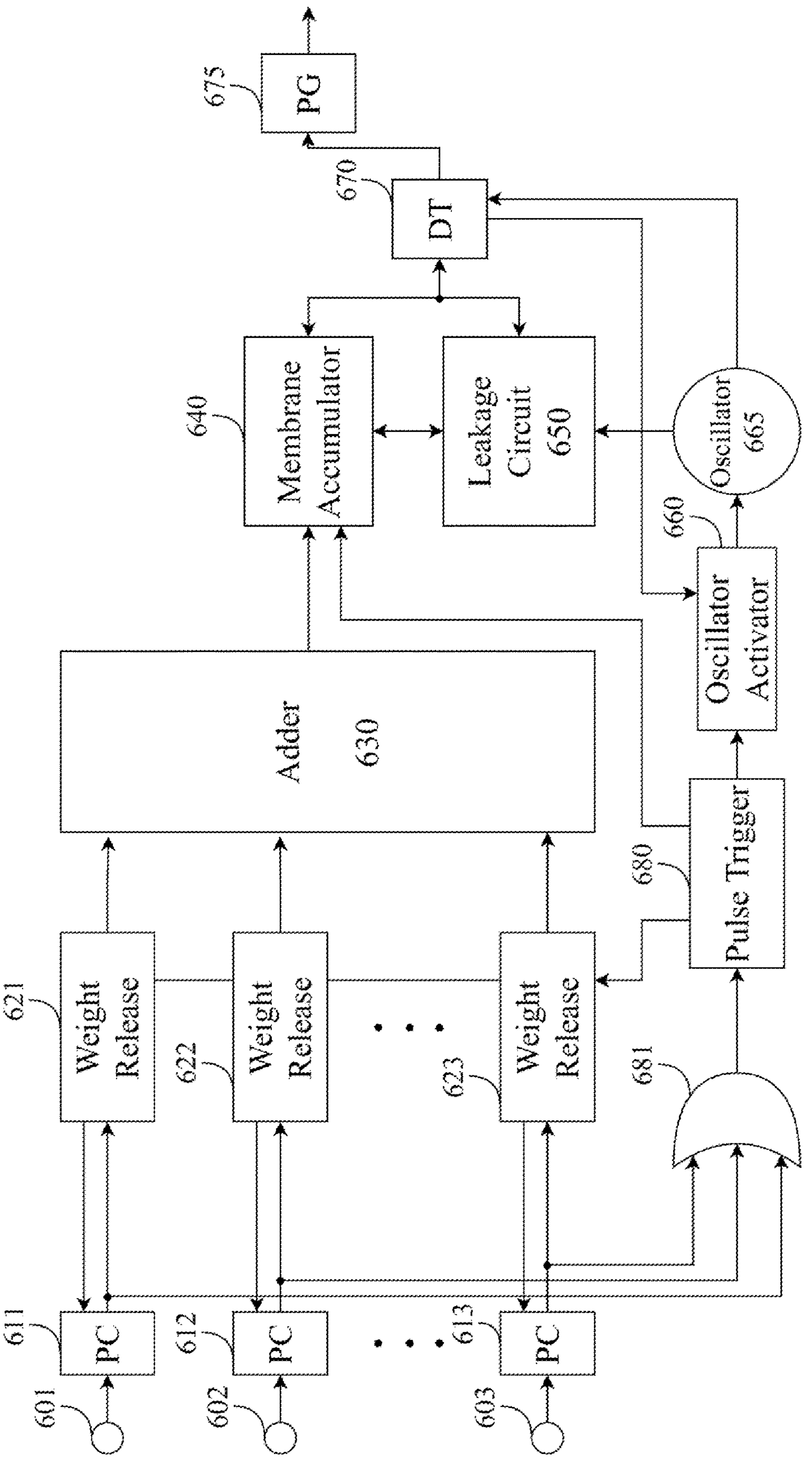
FIG. 6 shows schematically an example of a spiking neuron.

FIG. 6 shows schematically an example of a spiking neuron. The spiking neuron may include a neuron circuit suitable for a spiking neural network, as exemplarily provided with respect to FIG. 5. In more detail, the neuron circuit may include a plurality of inputs 601, 602, 603. Although the drawing shows three inputs 601, 602, 603, the neuron circuit may include more than (or less than) three inputs according to fan-in input connections configured for the neuron circuit. A spike detector including a plurality of pulse capturing elements 611, 612, 613 are coupled to the plurality of inputs 601, 602, 603. The neuron circuit may further include a weighing structure including a plurality of weight releasing elements 621, 622, 623, thereby each coupled input 601, 602, 603, respective pulse capturing element 611, 612, 613 and respective weight releasing element 621, 622, 623 forms an input path.

In other words, a first input 601 is coupled to a first pulse capturing element 611 that is coupled to a first weight releasing element 621 that is coupled to an adder 630 in a first input path. A second input 602 is coupled to a second pulse capturing element 612 that is coupled to a second weight releasing element 622 that is coupled to the adder 630 in a second input path. A third input 603 is coupled to a third pulse capturing element 613 that is coupled to a third weight releasing element 623 that is coupled to the adder 630 in a third input path. There may be further input paths including further elements similar to these input paths.

Each of the inputs 601, 602, 603 may be coupled to an output of a pre-synaptic neuron circuit. The pre-synaptic neuron circuit may structurally and functionally be similar or equivalent to the neuron circuit provided in FIG. 5. Each of the inputs 601, 602, 603 may provide an input spike signal that the input 601, 602, 603 received from the respective pre-synaptic neuron circuit which the input 601, 602, 603 is coupled to the respective pulse capturing element 611, 612, 613.

The pulse capturing elements 611, 612, 613 may include any type of detector that may detect an input spike signal. Each of the pulse capturing elements 611, 612, 613 may provide an indication of a received input spike signal from the respective input 601, 602, 603 to the corresponding weight releasing element 621, 622, 623. Furthermore, the signal detector may include a trigger circuit including a pulse trigger 680 and an OR gate 681. Each of the pulse capturing elements 611, 612, 613, may provide an indication of a received input spike signal from the respective input 601, 602, 603 to the trigger circuit including a pulse trigger 680 that is configured to generate a trigger signal based on the indication of a received input spike signal from any of the inputs 601, 602, 603.

The pulse trigger 680 may generate the trigger signal including a pulse indicating that an input spike signal has been received from at least one of the inputs 601, 602, 603. The pulse trigger 680 may provide the trigger signal to the weight releasing elements 621, 622, 623. The pulse trigger 680 may further provide the trigger signal to a membrane potential accumulator 640 and/or a leakage circuit 650.

Each of the weight releasing elements 621, 622, 623 may store information indicating a weight for the respective input 601, 602, 603. Each of the weight releasing elements 621, 622, 623 may access a stored information indicating a weight for the respective input 601, 602, 603. In other words, the first weight releasing element 621 may access information indicating a first weight defined for the first input 601, the second weight releasing element 622 may access to information indicating a second weight for the second input 602, and the third weight releasing element 623 may access to information indicating a third weight for the third input 603.

The neuron circuit may include an integration circuit including an adder. Each of the weight releasing elements 621, 622, 623 may be configured to send information indicating the respective weight to the adder 630. Each of the weight releasing elements 621, 622, 623 may be configured to send the respective weight to the adder 630 if the respective pulse capturing element 611, 612, 613 has triggered the respective weight releasing element 621, 622, 623.

Each of the weight releasing elements 621, 622, 623 may be configured to access the respective weight information for the respective input 601, 602, 603 when the respective weight releasing element 621, 622, 623 receives information indicating a detection of an input spike signal from the respective pulse capturing element 611, 612, 613. Otherwise (e.g. if the respective weight releasing element 621, 622, 623 did not receive detection indication), the weight releasing element 621, 622, 623 may be configured not to provide an output, or provide a zero signal. All of the weight releasing elements 621, 622, 623 may be configured to send information indicating the respective weight to the adder 630 when the weight releasing elements 621, 622, 623 receive the trigger signal from the pulse trigger 680.

Accordingly, the weight releasing elements 621, 622, 623 may set information indicating the respective weight to be transmitted to the adder 630 when the respective pulse capturing element 611, 612, 613 detects an input spike signal. Accordingly, only the weight releasing elements 621, 622, 623 which received an indication from the respective pulse capturing element 611, 612, 613 of the respective input path would send information indicating the determined weight to the adder 630. The weight releasing elements 621, 622, 623 may be configured to send zero signal (or zero value) when the weight releasing element 621, 622, 623 receives the trigger signal from the pulse trigger and when the weight releasing element 621, 622, 623 does not receive information indicating the detection of an input spike signal from the respective pulse capturing element 611, 612, 613.

In other words, a weight releasing element 621, 622, 623 may be configured to provide information indicating the weight of the respective input 601, 602, 603 to the adder 630 when the weight releasing element 621, 622, 623 receives a trigger from the pulse trigger 680, if the pulse capturing element 611, 612, 613 of the respective input has provided an indication to the weight releasing element 621, 622, 623 that an input signal is received.

The pulse capturing elements 611, 612, 613 may be configured to generate and send a signal (e.g. a high signal, 1, or a pulse) to the respective weight releasing elements 621, 622, 623 after the respective pulse capturing element 611, 612, 613 has detected an input spike signal, and the respective weight releasing element 621, 622, 623 may set its registers to include information indicating the weight based on the signal received from the respective pulse capturing elements 611, 612, 613. Otherwise, the registers may include information indicating a zero weight (or the weight releasing element 621, 622, 623 is configured to send a zero weight). When the pulse trigger 680 triggers all the weight releasing elements 621, 622, 623, the weight releasing elements 621, 622, 623 may send information in their registers. The registers may be configured to keep preferably 4-8 bits of information, though it can be configured according to the weight resolution of the neural network.

Furthermore, the weight releasing elements 621, 622, 623 may initialize (e.g. set zero weight) to their registers after they send information indicating the weight of the respective input 601, 602, 603 to the adder 630. Furthermore, the weight releasing elements 621, 622, 623 may send information indicating a reset operation to the pulse capturing elements 611, 612, 613, so that the pulse capturing elements 611, 612, 613 may revert back to an initial mode. The pulse capturing elements 611, 612, 613, may be configured to indicate to the weight releasing elements 621, 622, 623 that they operate in the initial mode. The pulse capturing elements 611, 612, 613 may send another signal or stop sending a high signal, 1 to provide the indication.

Based on the information which the adder 630 may receive from the weight releasing elements 621, 622, 623, the adder 630 may perform a sum operation by summing the weights that the weight releasing elements 621, 622, 623 provide and provide an output indicating the summed weights of the weight releasing elements 621, 622, 623 to membrane potential circuit including a first accumulator ("membrane potential accumulator 640").

The membrane potential accumulator 640 may be configured to store and adjust the integration value (i.e. membrane potential) as provided in this disclosure. In an initial mode in which the neuron circuit has not received any input, the membrane potential accumulator 640 may include information indicating a resting membrane potential for the neuron circuit. The resting membrane potential may be zero or may be a predefined value indicating a resting membrane potential. The membrane potential accumulator 640 may store information indicating the resting membrane potential in a memory. Alternatively, the membrane potential accumulator 640 may receive (or access) information indicating the resting membrane potential.

The membrane potential accumulator 640 may include a memory (e.g. registers) configured to store an integration value indicating an actual membrane potential at an instance of time. As indicated, the integration value at an initial mode of operation in which the neuron circuit has not received any input spike signals may be equal to the resting membrane potential. The resting membrane potential may be zero.

The membrane potential accumulator 640 may be configured to adjust the integration value based on the information which the membrane potential accumulator 640 receives from the adder 630. The membrane potential accumulator 640 may receive information indicating the sum of weights which the weight releasing elements 621, 622, 623 provide based on the trigger signal. The membrane potential accumulator 640 may be configured to add the received sum of weights to the integration value to perform the accumulation. The membrane potential accumulator 640 may be configured to perform the accumulation after an instance of time which the pulse trigger 680 triggers the weight releasing elements 621, 622, 623. For example, the weight releasing elements 621, 622, 623 may be configured to provide weights to the adder 630 with a positive transition of the trigger signal (e.g. when the pulse signal changes from a low signal to a high (0 to 1) signal, and the membrane potential accumulator 640 may be configured to perform the accumulation with a negative transition of the trigger signal (e.g. when the generated pulse changes from the high signal to a low signal).

Accordingly, with each trigger signal indicating a received input spike signal from one of the inputs 601, 602, 603, the membrane potential accumulator 640 may perform accumulation to obtain the integration value based on the determined weights for the instance of time. The trigger signal may trigger the membrane potential accumulator 640 to perform the accumulation.

The neuron circuit may further include a leakage circuit 650, an oscillator activator 660, and a triggerable oscillator 665. The oscillator activator 660 may be configured to activate or deactivate the triggerable oscillator 665 based on the trigger signal, and/or based on integration value and a leakage value to be generated/stored in the leakage circuit 650 as indicated with respect to FIG. 5. The leakage circuit 650 may be configured to obtain a leakage value based on the oscillator signal.

The leakage circuit 650 may include a second accumulator (i.e. leakage accumulator). The leakage accumulator may store and adjust the leakage value as provided in this disclosure. In an initial mode in which the neuron circuit has not received any input, the leakage accumulator may include information indicating a predefined leakage value for the neuron circuit. The predefined leakage value may be zero or may be a predefined value indicating an initial leakage value. The leakage circuit 650 may adjust the leakage value in response to the oscillator signal, i.e. each oscillation of the oscillator signal based on a predefined leakage rate value, or based on the integration value stored in the membrane potential accumulator 640, and/or the leakage value of a current or an earlier instance of time.

The neuron circuit may further include a determiner 670. The determiner 670 may include a plurality of comparators. The determiner 670 may determine activation or deactivation of the triggerable oscillator 665. The determiner 670 may determine to deactivate the triggerable oscillator 665 based on the integration value and the leakage value at an instance of time. The determiner 670 may compare the integration value and the leakage value. The determiner 670 may determine to deactivate the triggerable oscillator 665 in case the leakage value is greater than (or equal to) the integration value. The determiner 670 may perform the determination with respect to the integration value and the leakage value based on the oscillator signal, or alternatively based on the trigger signal. Accordingly, the determiner 670 may output a reset signal to provide the indication.

Furthermore, the determiner 670 may determine to deactivate the triggerable oscillator 665 based on the integration value and a predefined membrane potential threshold value at an instance of time. The determiner 670 may compare the integration value and the predefined membrane potential threshold value. The determiner 670 may determine to deactivate the triggerable oscillator 665 in case the integration value is greater than (or equal to) the predefined membrane potential threshold value. The determiner 670 may perform the determination with respect to the integration value and the predefined membrane potential threshold value based on the trigger signal. In addition, the determiner 670 may further determine to deactivate the triggerable oscillator 665 in case the integration value is less than the predefined resting membrane potential, for example, to disregard an inhibitory effect of a first input spike signal which the spiking neuron receives. Accordingly, the determiner 670 may output a reset signal to provide the indication. Furthermore, the determiner 670 may further output a firing indication to be provided to the spike generation circuit (e.g. pulse generator) 675 which generates an output spike signal in response to the firing indication.

In response to a reset signal, the neuron circuit may switch its operation mode to the initial operation mode. The membrane potential accumulator 640 may reset the integration value to the predefined membrane resting potential value. The leakage circuit 650 may reset the leakage value to a predefined initial leakage value. The weighing releasing elements 621, 622, 623 may reset (or adjust based on a learning event) the weight values. The oscillator activator 660 may deactivate the triggerable oscillator 665. The neuron circuit may include a delay circuit to provide a delay for a period of time between the respective determination of the determiner 670 and the generation of the reset signal. Alternatively, a delay circuit may receive the reset signal to introduce a predefined delay for a refractory period.

The leakage function which the oscillator activator 660, the triggerable oscillator 665, and the leakage circuit 650 provide with respect to the neuron circuit of FIG. 6 may be an optional function. The skilled person would acknowledge that the neuron circuit of FIG. 6 may operate as a neuron circuit without the oscillator activator 660, the triggerable oscillator 665, and the leakage circuit 650 as an integrate and fire model neuron circuit, or with an alternative circuit that is configured to provide the leakage function.

Figure 7:
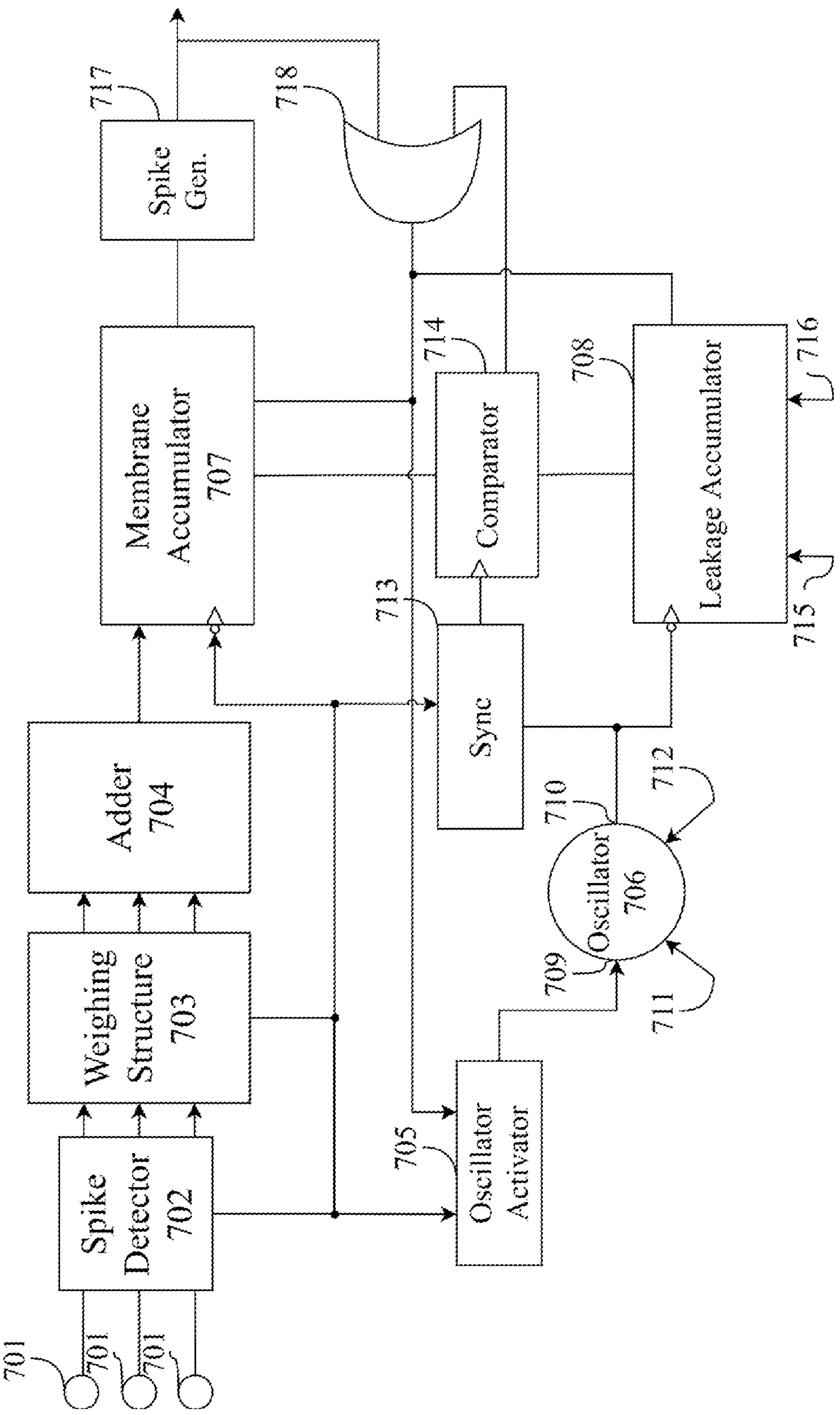
FIG. 7 shows schematically an example of a spiking neuron.

FIG. 7 shows schematically an example of a spiking neuron. The spiking neuron may be the spiking neuron as depicted in FIG. 6 including a plurality of inputs 701, a spike detector 702 (e.g. plurality of pulse capturing elements, trigger circuit) configured to provide a received spike indication and a received spike input indication, a weighing structure 703 (e.g. plurality of weight releasing elements), an adder 704, an oscillator activator 705, and an oscillator 706, and a membrane potential accumulator 707 to obtain an integration value. The oscillator activator 705 may receive the received spike indication (e.g. trigger signal) from the spike detector 702 and activate or deactivate the oscillator 706 to generate an oscillator signal. The oscillator 706 may include a triggerable and frequency controllable oscillator. Furthermore, the weighing structure 703 may provide the determined weights of received input spike signals to the adder 704 which outputs the sum of determined weights. The details of this operation have been provided with respect to FIG. 6.

The spiking neuron may further include a leakage accumulator 708. In an initial mode of operation, in which the spiking neuron has not received any input signal for a period of time, and the integration value of the membrane potential accumulator is at a resting membrane potential, the leakage accumulator 708 stores the leakage value as a predefined initial leakage value (e.g. 0).

In response to a received input spike signal, the oscillator activator 705 may receive the trigger signal and the oscillator activator 705 may activate the oscillator 706 by providing a signal from a trigger input 709 of the oscillator 706. Accordingly, the oscillator 706 may provide the oscillator signal from the output 710. In other words, the oscillator 706 may begin providing the oscillator signal from the output 710 when the oscillator 706 receives the input signal via the trigger input 709. The oscillator 706 may be a triggerable ring oscillator. The oscillator 706 may provide the oscillator signal until the oscillator activator 705 deactivates the oscillator 706 in response to a reset signal. The oscillator activator 705 may receive further trigger signals.

The oscillator 706 may further include a frequency control input 711 that is configured to receive an indication to control the frequency of the oscillator signal which the oscillator 706 generates. The frequency of the oscillator 706 may be defined according to a desired leakage response during the design of the neural network. The oscillator 706 may further include a disable input 712 to receive an indication to disable the oscillator 706. When the oscillator activator 705 receives a reset signal, the oscillator activator 705 may deactivate the oscillator 706.

The oscillator activator 705 may further include a controller to control the frequency of the oscillator signal. The controller may provide a control signal to the frequency control input of the oscillator 706 to adjust the frequency of the oscillator signal. The controller may control the frequency of the oscillator signal based on a parameter stored in a memory. The controller may control the frequency of the oscillator signal based on an input control signal.

The oscillator 706 may provide the oscillator signal via its output 710 to a synchronizer 713 and the leakage accumulator 708. The synchronizer 713 may be configured to synchronize received trigger signals with the oscillator signal. The synchronizer 713 accordingly may be configured to provide synchronized trigger signals including trigger signals that the synchronizer 713 synchronized according to the oscillator signal to a determiner including a comparator 714.

The leakage accumulator 708 may include a memory to store a leakage value. The leakage value may indicate a leakage amount that the leakage circuit has accumulated starting from a period of time by receiving the first input spike signal. The leakage accumulator 708 may access the predefined initial leakage value via its input 715. Accordingly, the leakage value in the initial mode may be the predefined initial leakage value.

The leakage accumulator 708 may be configured to receive the oscillator signal as an input signal (e.g. a clock signal). The leakage accumulator 708 may be configured to increase the leakage value at a first instance of time by a predefined increment value to obtain the leakage value at a second instance of time. The leakage accumulator 708 may increase the leakage value by the predefined increment value per each negative (or positive) transition of the oscillator signal from a high signal to a low signal. The leakage accumulator 708 may be configured to receive a control signal indicating the predefined leakage rate value from a rate value input 716. The predefined leakage rate value may be defined according to a desired leakage response during the design of the neural network.

Furthermore, the neuron circuit may include a controller to provide a first predefined leakage rate value from the rate value input 716 at a first instance of time and a second predefined leakage rate value from the rate value input 716 at a second instance of time to provide different increments to the leakage value. Accordingly, different leakage value rates at different time instances to adjust the leakage value in a non-linear configuration may be obtained.

Accordingly, when the leakage accumulator 708 starts receiving the oscillator signal from the oscillator 706, the leakage accumulator 708 may begin accumulating the leakage value. The oscillator 706 may provide the oscillator signal to the leakage accumulator 708 to trigger addition of predefined leakage rate value to the leakage value that is stored in the memory of the leakage accumulator 708 at a first instance of time, resulting in the leakage value that is stored in the memory of the leakage accumulator 708 at a second instance of time following the first instance of time to be the sum of the predefined leakage rate value and the leakage value at the first instance of time.

Accordingly, the leakage value that the leakage accumulator 708 stores in the memory may be a function of the frequency of the oscillator signal which the leakage accumulator 708 receives, and the predefined leakage rate value. A controller that may provide control signals to adjust the frequency of the oscillator 706 and/or the predefined leakage rate value of the leakage accumulator 708 in order to adjust the rate and/or increase the leakage value (i.e. adjusting the transfer function of the leakage circuit). For example, the controller may be configured to provide the control signals based on a mapping operation including the integration value at an instance of time. Accordingly, the leakage accumulator 708 may adjust the leakage value based on the integration value. Furthermore, the controller may be configured to provide the control signals based on a mapping operation including time, in order to provide different adjustments over the leakage value over time, exemplarily via a predefined mapping operation/transfer function.

For example, the controller of the oscillator activator 705 may control the frequency of the oscillator signal based on the leakage value stored in the leakage accumulator 708. The controller of the oscillator activator 705 may control the frequency of the oscillator signal based on the integration value stored in the membrane potential accumulator 707. The controller of the oscillator activator 705 may control the frequency of the oscillator signal based on the integration value stored in the membrane potential accumulator 707 and the leakage value stored in the leakage accumulator 708.

The comparator 714 may be configured to determine to activate or deactivate the oscillator 706 based on the leakage value and the integration value. The comparator 714 may be coupled to the leakage accumulator 708 and the membrane potential accumulator 707 of the neuron circuit to receive the leakage value and the integration value. The comparator 714 may be configured to access the leakage value and the integration value.

The comparator 714 may compare the leakage value and the membrane potential. The comparator 714 may determine to deactivate the oscillator 706 if the leakage value is greater than (or equal to) the integration value. Accordingly, the comparator 714 may determine to deactivate the oscillator 706 if the leakage value is greater than the integration value. The comparator 714 may output a reset signal from its output indicating that the leakage value is greater than the integration value to reset various elements of the neuron circuit.

Furthermore, the neuron circuit may include a spike generation circuit 717 including a comparator to determine to activate or deactivate the oscillator 706 based on the integration value and a predefined membrane potential threshold value. The comparator of the spike generation circuit 717 may determine to deactivate the oscillator 706 based on the integration value and the predefined membrane potential threshold value. The comparator may determine to deactivate the oscillator 706 if the integration value is greater than (or equal to) the predefined membrane potential threshold value. In addition, the comparator may further determine to deactivate the oscillator 706 in case the integration value is less than the predefined resting membrane potential, for example, to disregard an inhibitory effect of a first input spike signal which the spiking neuron receives. Accordingly, the comparator may output a reset signal. Furthermore, based on the determination, the spike generation circuit 717 may generate an output spike to be transmitted to post-synaptic neurons.

An OR logic 718 may be coupled to a reset output of the comparator 714 and an output of the spike generation circuit 717 to receive reset signals and provide a reset signal from its output to provide an indication of a reset operation to the components of the neuron circuit. In response to a received reset signal, the membrane potential accumulator 707 may reset the integration value to the predefined membrane resting potential value, and/or the leakage accumulator 708 may reset the leakage value to the predefined initial leakage value. Furthermore, in response to the received reset signal, the oscillator activator 705 may deactivate the oscillator 706. The neuron circuit may include a delay circuit to provide a delay for a period of time between the respective determinations from the comparators and the generation of the reset signal. Alternatively, a delay circuit may receive the reset signal to introduce a predefined delay for a refractory period.

Figure 8:
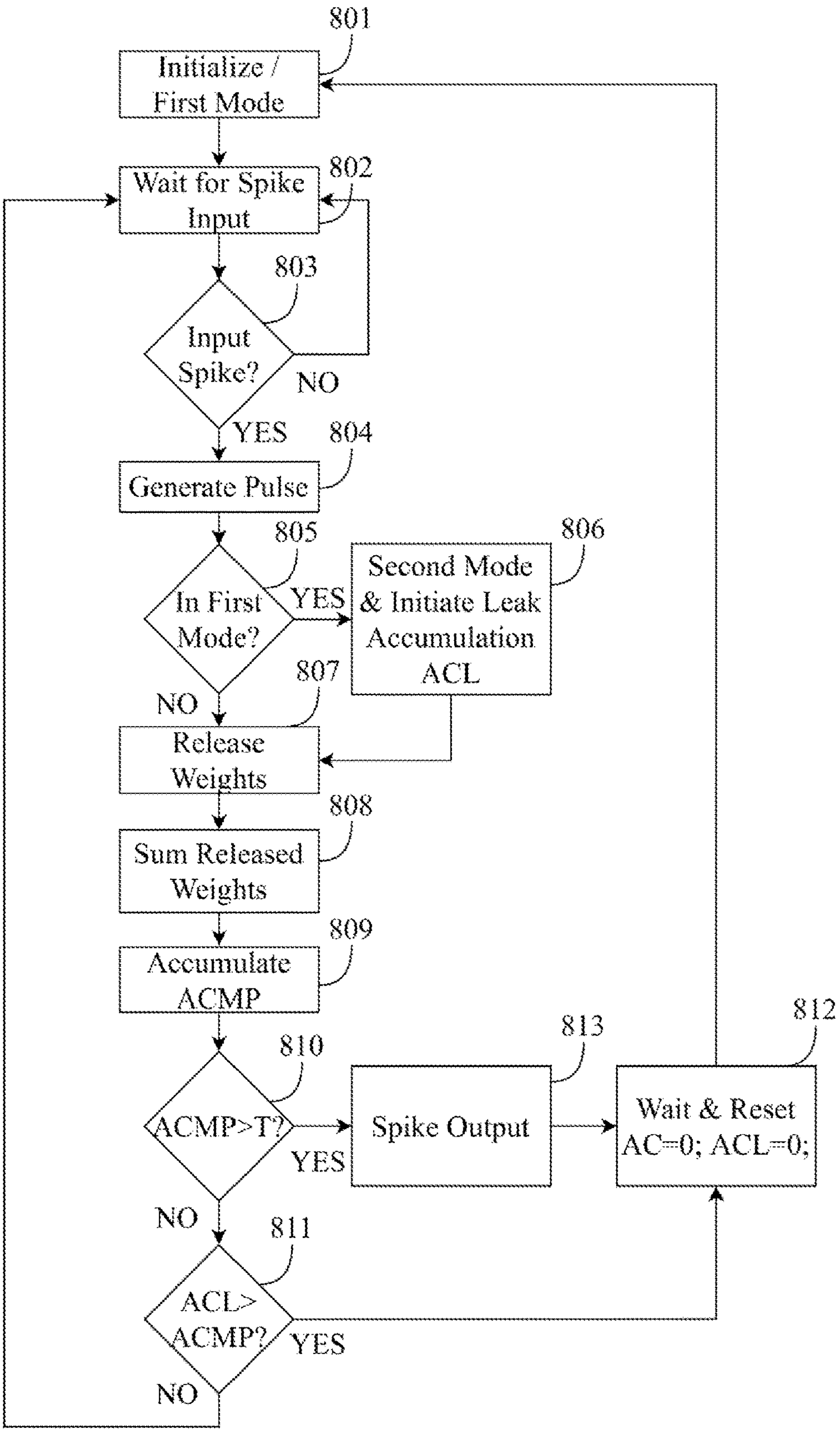
FIG. 8 shows a flowchart illustrating an operation of a neuron circuit.

FIG. 8 shows a flowchart illustrating an operation of a neuron circuit. The neuron circuit may be the neuron circuit 500 as exemplary provided in FIG. 7. The neuron circuit may have a first operation mode 801 in which the membrane potential is at a resting potential and the leakage circuit may operate at a first operation mode which may be an operation mode in which the leakage circuit does not provide a leakage function.

The neuron circuit may include a plurality of inputs that are coupled to outputs of a plurality of pre-synaptic neuron circuits. The neuron circuit may wait 802 for a spike input in the first operation mode to be received from the plurality of inputs of the neuron circuit. When the neuron circuit receives 803 a spike input, the neuron circuit may generate an indication of a received spike input. The neuron circuit may generate 804 the indication in a form of a pulse signal.

In case the neuron circuit operates in the first operating mode 805, the neuron circuit may switch its operation mode from the first operating mode to a second operation mode 806 by receiving the trigger signal. The leakage circuit may further receive 806 the trigger signal and start operating in the second operation mode. The leakage circuit may include a triggerable operator to switch the operation mode of the leakage circuit from the first operation mode to the second operation mode 806. Accordingly, the leakage circuit may initiate 806 the leakage function and accumulation of the leakage amount ("ACL").

The trigger signal may further trigger the release of weights 807 for each of the input spikes. There may be one or more spike inputs that the neuron circuit received, and the neuron circuit may sum 808 the released weights of the plurality of inputs that received an input spike. The neuron circuit may perform the accumulation 809 (i.e. accumulate the membrane potential "ACMP") 809 with the sum of weights. After the neuron circuit performs the accumulation, the neuron circuit may compare the accumulated membrane potential (ACMP) and a membrane potential threshold (T) 810.

If the accumulated membrane potential (ACMP) is below 810 the membrane potential threshold (T), the neuron circuit may compare 811 the accumulated membrane potential (ACMP) and the accumulated leakage amount (ACL). If the accumulated leakage amount (ACL) is less than 811 the accumulated membrane potential (ACMP), the neuron circuit may wait 802 for an input spike for another cycle of operation. If the accumulated leakage amount (ACL) is greater than 811 the accumulated membrane potential (ACMP), the neuron circuit may wait 812 to mimic a refractory period, the neuron circuit may reset 812 the accumulated leakage amount (ACL) and the accumulated membrane potential (ACMP) to their initial values (may be 0), and initialize 801 the neuron circuit by switching to the first operation mode. If the accumulated membrane potential is above 810 the membrane potential threshold (T), the neuron circuit may output 813 a spike to be transmitted to a plurality of post-synaptic neuron circuits. Then, the neuron circuit may wait 812 to mimic a refractory period, the neuron circuit may reset 812 the accumulated leakage amount (ACL) and the accumulated membrane potential (ACMP) to their initial values (may be 0), and initialize 801 the neuron circuit by switching to the first operation mode.

Figure 9:
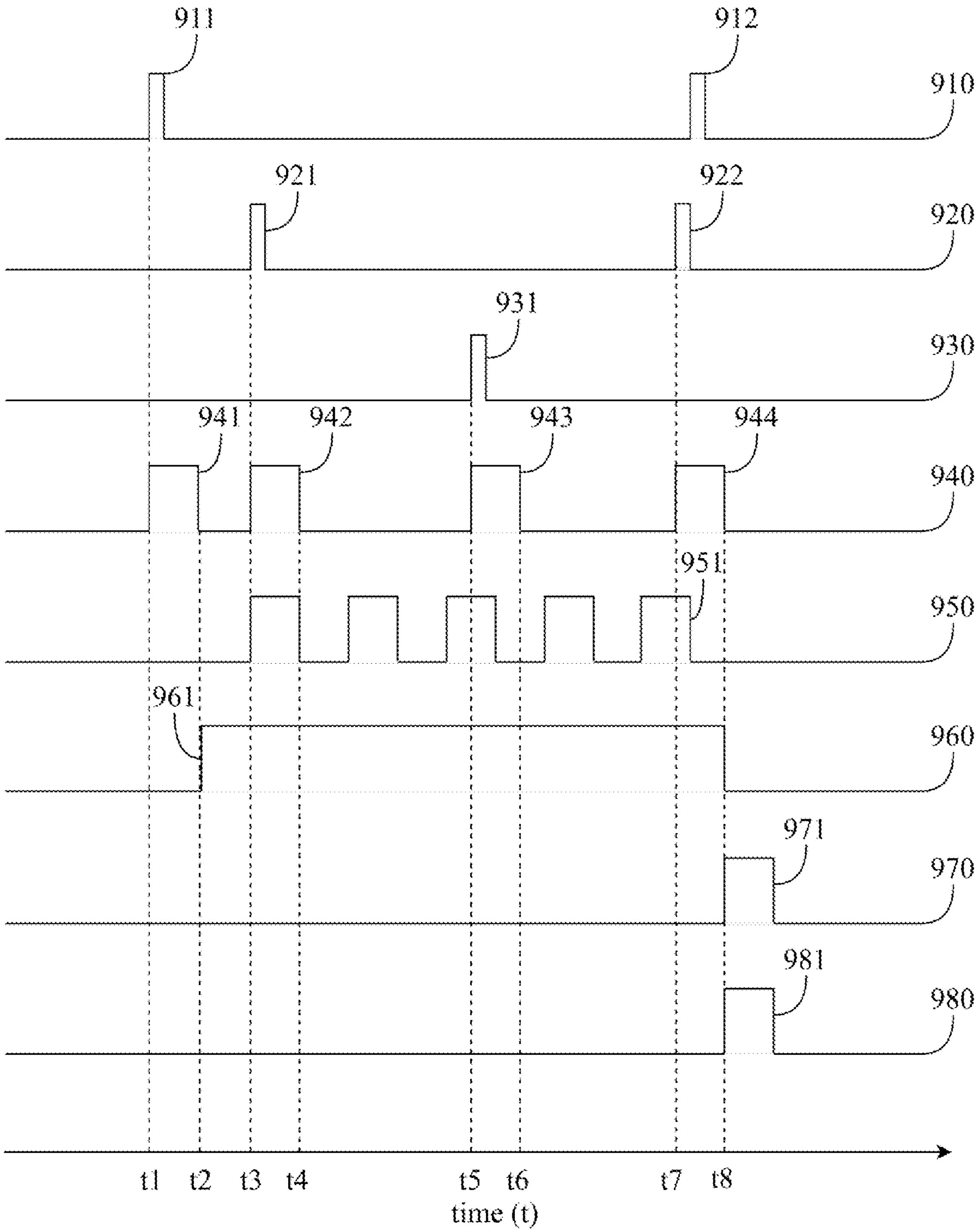
FIG. 9 shows an example of a timing diagram illustrating various functions of a neuron circuit.

FIG. 9 shows an example of a timing diagram illustrating various functions of a neuron circuit. The neuron circuit may include the neuron circuit described in FIG. 5. The neuron circuit may include a plurality of inputs, and each of the inputs may be coupled to an output of a pre-synaptic neuron circuit. The plurality of inputs may include a first input, a second input, and a third input. Input signal characteristics (i.e. i(t), voltage over time) of the first input are provided as 910. Input signal characteristics of the second input are provided as 920. Input signal characteristics of the third signal are provided as 930.

The diagram further illustrates the output of a pulse trigger 940 that is configured to provide an indication of a received input spike signal for the input spike signals of the first input, the second input, and the third input. The diagram further illustrates the output of an oscillator 950 coupled to a leakage circuit that is configured to provide a leaking function. The diagram further includes a signal indicating the operation of the oscillator activator 960 (e.g. a control signal to activate or deactivate the oscillator 950). The diagram further illustrates the output signal characteristic of the neuron circuit 970, and the reset signal 980.

Figure 10:
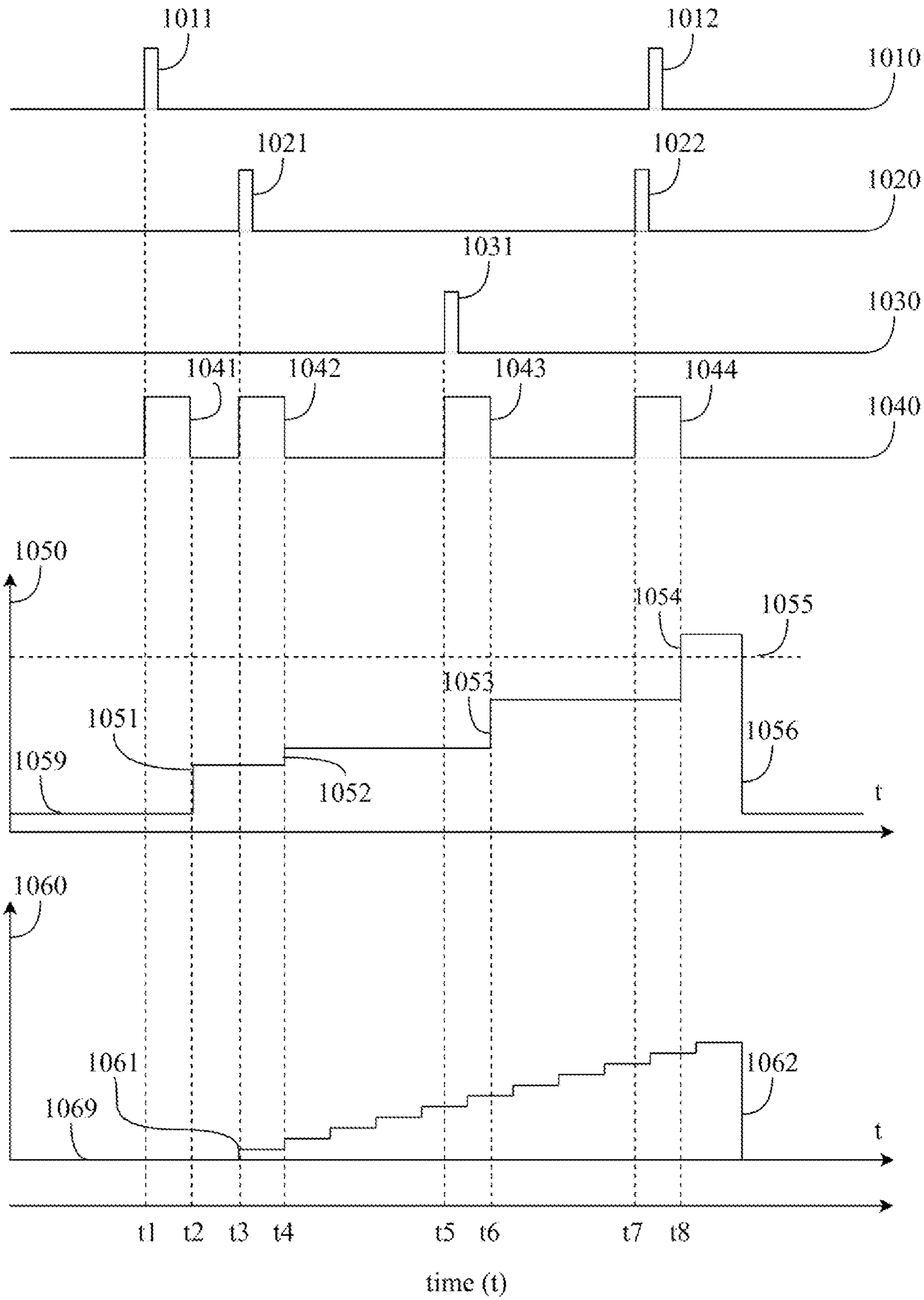
FIG. 10 shows an example of a timing diagram illustrating membrane potential accumulator and leakage accumulator of the neuron circuit.

FIG. 10 shows an example of a timing diagram illustrating membrane potential accumulator and leakage accumulator of the neuron circuit. The timing diagram of FIG. 10 illustrates certain characteristics that are the same as FIG. 9, such as the input signal characteristics of the first input 1010, the input signal characteristics of the second input 1020, the input signal characteristics of the third input 1030, and the output of the trigger signal 1040. Furthermore, the diagram includes a diagram showing the integration value ("membrane potential") 1050 stored in a membrane potential accumulator and the leakage value 1060 stored in a leakage accumulator. FIG. 9 and FIG. 10 are described collectively.

In these exemplary diagrams, the neuron circuit operates at a first operating mode before the neuron circuit receives a first spike 911, 1011. At the first operation mode, there are no pulses that the trigger signal generates as seen in 940, 1040. The oscillator operates in the first operating mode (e.g. a low power mode/turned off) as seen in 950, and the oscillator activator does not activate the oscillator with a signal 960. The integration value is at a resting membrane potential 1059, and the leakage value is zero 1069. The integration value or the leakage value does not increase in the first operation mode.

The neuron circuit receives the first spike 911, 1011 in a first instance of time (t1). The trigger circuit of the neuron circuit may be configured to generate a first trigger signal 941, 1041, substantially in the same instance of time (t1). The first trigger signal 941, 1041 may provide an indication of the first input spike signal 911, 1011 at the first instance of time (t1) to various components of the neuron circuit as provided in this disclosure. The neuron circuit may switch the operation mode to the second operation mode via the first trigger signal 941, 1041. The neuron circuit may be configured to provide the first trigger signal 941, 1041 to various components to indicate the arrival of the first input spike signal 911, 1011 at the first instance of time (t1), and various components may start operating in the second operation mode with the first trigger signal 941, 1041.

The first trigger signal 941, 1041 may trigger the oscillator activator to activate the oscillator ("second operation mode"). The oscillator activator may be configured so, such that the first trigger signal 941, 1041 may trigger the oscillator activator to activate the oscillator 961 with a negative transition of the first trigger signal 941, 1041 (from a signal of a high level to a low level) substantially at a second instance of time (t2).

Furthermore, the first trigger signal 941, 1041 may trigger weight releasing elements to release determined weights to an adder, and the membrane potential accumulator may receive the released determined weights from the adder and adjust the integration value 1050 stored in the membrane potential accumulator. The neuron circuit received the first input spike signal 911, 1011 at the first instance of time (t1), and accordingly, the adder may provide the determined weight for the first input to the membrane potential accumulator.

The membrane potential accumulator may be configured so, such that the first trigger signal 941, 1041 may trigger the membrane potential accumulator to perform accumulation with a negative transition of the first trigger signal 941, 1041 (from a signal of a high level to a low level) substantially at the second instance of time (t2). Accordingly, the membrane potential accumulator may add 1051 the determined weight of the first input to the membrane resting potential 1059 increasing 1051 the integration value of the neuron circuit to a first integration value at substantially the second instance of time (t2).

Furthermore, as provided in this disclosure the neuron circuit may perform further functions, including comparing the integration value 1050 stored in the membrane potential accumulator (the first integration value) with a predefined membrane potential threshold 1055, comparing the integration value 1050 stored in the membrane potential accumulator (the first integration value) with the leakage value stored in the leakage accumulator, etc.

The neuron circuit may receive the second input spike signal 921, 1021 at a third instance of time (t3). The trigger circuit of the neuron circuit may be configured to generate a second trigger signal 942, 1042, substantially in the same instance of time (t3). The second trigger signal 942, 1042 may provide an indication of the second input spike signal 921, 1021 at the third instance of time (t3) to various components of the neuron circuit as provided in this disclosure.

The second trigger signal 942, 1042 may trigger the weight releasing elements to release determined weights to the adder, and the membrane potential accumulator may receive the released determined weights from the adder and adjust the integration value 1050 stored in the membrane potential accumulator. The neuron circuit receives the second input spike signal 921, 1021 at the third instance of time (t3), and accordingly, the adder may provide the determined weight for the second input to the membrane potential accumulator.

Similar to the operation with the first input spike signal 911, 1011, the membrane potential accumulator may add 1052 the determined weight of the second input to the integration value at the third instance of time (t3). The integration value being the first integration value, the membrane potential accumulator may add 1052 the determined weight of the second input, increasing 1052 the integration value of the neuron circuit to a second integration value at substantially the fourth instance of time (t4).

Furthermore, with the operation of the oscillator, the oscillator may provide the oscillator signal 951 to the leakage accumulator. The diagrams exemplarily show that the oscillator starts providing the oscillator signal 951 substantially at the third instance of time (t3) which is incidental. The oscillator may start providing the oscillator signal 951 for another instance of time as well. The leakage accumulator may receive the oscillator signal 951 and the leakage accumulator may start accumulating 1061 the leakage value at the third instance of time (t3). The leakage accumulator may be configured to accumulate the leakage value based on the frequency of the oscillator signal 951 and a predefined leakage increment value. The neuron circuit may adjust the frequency of the oscillator signal 951 and the predefined leakage increment value in order to adjust the accumulation of the leakage value.

Furthermore, as provided in this disclosure the neuron circuit may perform further functions, including comparing the integration value 1050 stored in the membrane potential accumulator (the second integration value) with the predefined membrane potential threshold 1055, comparing the integration value 1050 stored in the membrane potential accumulator (the second integration value) with the leakage value stored in the leakage accumulator, etc.

The neuron circuit may receive the third input spike signal 931, 1031 at a fifth instance of time (t5). The trigger circuit of the neuron circuit may be configured to generate a third trigger signal 943, 1043, substantially in the same instance of time (t5). The third trigger signal 943, 1043 may provide an indication of the third input spike signal 931, 1031 at the fifth instance of time (t5) to various components of the neuron circuit as provided in this disclosure.

The third trigger signal 943, 1043 may trigger the weight releasing elements to release determined weights to the adder, and the membrane potential accumulator may receive the released determined weights from the adder and adjust the integration value 1050 stored in the membrane potential accumulator. The neuron circuit receives the third input spike signal 931, 1031 at the fifth instance of time (t5), and accordingly, the adder may provide the determined weight for the third input to the membrane potential accumulator.

Similar to the operation with the first input spike signal 911, 1011, the membrane potential accumulator may add 1053 the determined weight of the third input to the integration value at the fifth instance of time (t5). The integration value being the second integration value at the fifth instance of time (t5), the membrane potential may add 1053 the determined weight of the third input, increasing 1053 the integration value of the neuron circuit to a third integration value at substantially the sixth instance of time (t6).

Furthermore, as provided in this disclosure the neuron circuit may perform further functions, including comparing the integration value 1050 stored in the membrane potential accumulator (the third integration value) with the predefined membrane potential threshold 1055, comparing the integration value 1050 stored in the membrane potential accumulator (the third integration value) with the leakage value stored in the leakage accumulator, etc.

The neuron circuit may receive the fourth input spike signal 922, 1022 at a seventh instance of time (t7). The trigger circuit of the neuron circuit may be configured to generate a fourth trigger signal 944, 1044, substantially in the same instance of time (t7). The fourth trigger signal 944, 1044 may provide an indication of the fourth input spike signal 913, 1013 at the seventh instance of time (t7) to various components of the neuron circuit as provided in this disclosure.

Furthermore, the neuron circuit may receive the fifth input spike signal 912, 1012 within the duration of the fourth trigger signal 944, 1044. The fourth trigger signal 943, 1043 may trigger the weight releasing elements to release determined weights to the adder, and the membrane potential accumulator may receive the released determined weights from the adder and adjust the integration value 1050 stored in the membrane potential accumulator. The neuron circuit receives the fourth input spike signal 922, 1022, and the fifth spike 912, 1012 starting from the seventh instance of time (t7) within the duration of the fourth trigger signal 944, 1044. Accordingly, the adder may provide the sum of the determined weight for the second input with respect to the fourth input spike signal 922, 1022, and the determined weight for the first input with respect to the fifth input spike signal 912, 1012 to the membrane potential accumulator.

Similar to the operation with the first input spike signal 911, 1011, the membrane potential accumulator may add 1054 the sum of the determined weight for the second input with respect to the fourth input spike signal 922, 1022, and the determined weight for the first input with respect to the fifth input spike signal 912, 1012 to the integration value at the seventh instance of time (t7). The integration value being the third integration value at the seventh instance of time (t7), the membrane potential accumulator may add 1054 the sum of the determined weight for the second input with respect to the fourth input spike signal 922, 1022, and the determined weight for the first input with respect to the fifth input spike signal 912, 1012, increasing 1054 the integration value (the third integration value) of the neuron circuit to a fourth integration value at substantially the eighth instance of time (t8).

Furthermore, as provided in this disclosure, the neuron circuit may perform further functions, including comparing the integration value 1050 stored in the membrane potential accumulator (the fourth integration value) with the predefined membrane potential threshold 1055. As depicted in the diagram with respect to the integration value 1050, the fourth integration value stored in the accumulator is above the predefined membrane threshold 1055. The neuron circuit may include a logic to provide an indication that the integration value 1050 is above the predefined membrane threshold 1055 to a pulse generator. The pulse generator may transmit an output spike 971 based on the indication. The indication may include the reset signal 981. The neuron circuit may be configured to provide the reset signal to various components to change the operation of the neuron circuit (or various components) back to the first operation mode. Exemplarily, the neuron circuit may include a delay component to provide a predefined time delay to the reset signal to introduce a refractory period for the neuron circuit after the neuron circuit has provided the output spike.

The neuron circuit may be configured to convey the reset signal to the oscillator activator, so that the oscillator activator may deactivate the oscillator 961 (i.e. in an operation mode in which the oscillator ceases providing the oscillator signal 951). The neuron circuit may be configured to convey the reset signal to the membrane potential accumulator to reset the membrane potential accumulator (i.e. adjust the integration value 1050 back 1056 to the resting membrane potential 1059). The neuron circuit may be configured to convey the reset signal to the leakage accumulator to reset the leakage accumulator (i.e. adjust the leakage value 1060 back 1062 to the initial leakage value 1069 which is zero).

Accordingly, the neuron circuit may enter into the first operation mode in which the membrane potential of the neuron circuit is at the resting membrane potential, the leakage circuit does not provide the leakage function, and the pulse capturing elements are ready to capture an input spike signal, that is ready to operate for the next cycle of operation.

Figure 11:
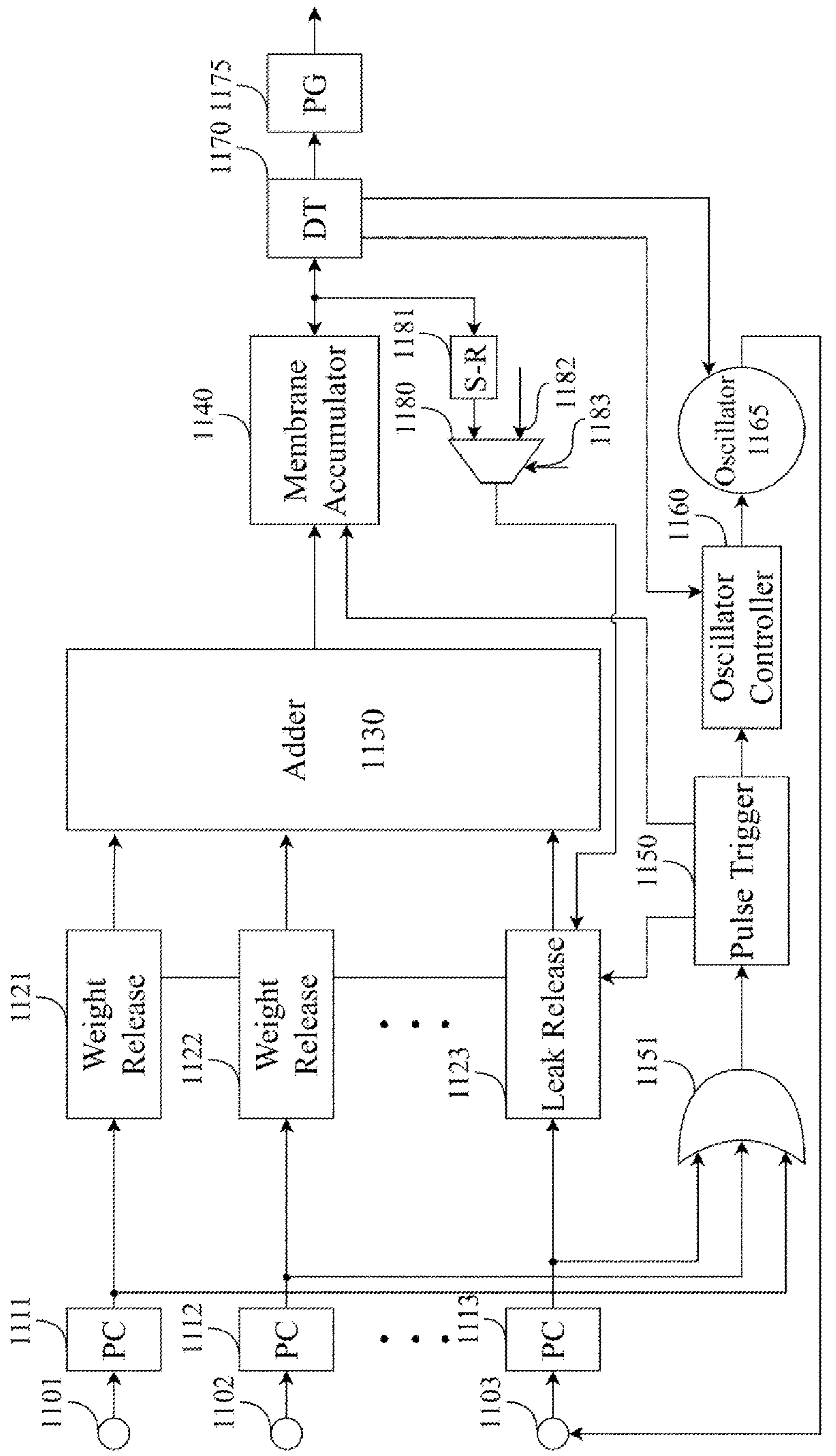
FIG. 11 shows schematically an example of a spiking neuron.

FIG. 11 shows schematically an example of a spiking neuron. The spiking neuron may include various functions of the spiking neuron with respect to FIG. 6. The spiking neuron may include a plurality of inputs 1101, 1102 to receive input spike signals, a signal detector including pulse capturing elements 1111, 1112 to detect input signals including input spike signals, a weighing structure including a plurality of weight releasing elements 1121, 1122 to apply a weight for inputs, an adder 1130 to provide the sum of applied weights to a membrane potential accumulator 1140 storing a membrane potential value.

Furthermore, the spiking neuron may include an oscillator controller 1160 configured to activate or deactivate a triggerable oscillator 1165 that is configured to generate an oscillator signal and provide the oscillator signal from its output. The triggerable oscillator 1165 may include a triggerable and frequency-controllable oscillator.

In this example, the spiking neuron may be configured in a manner to store the difference of the integration value and the leakage value in the same memory as the membrane potential value stored in the membrane potential accumulator 1140. In other words, the spiking neuron may be configured to obtain the integration value based on received input spike signals and their weights, and the leakage circuit may be configured to apply the leakage value in response to the oscillator signal by adjusting the integration value.

The leakage circuit may be configured to provide the adjustment to the integration value linearly, as in the leakage circuit may be configured to adjust the integration value with a predefined leakage rate value in response to the oscillator signal including the same oscillation frequency. Alternatively, the leakage circuit may be configured to provide the adjustment with a mapping operation/transfer function of the integration value. As the integration value increases, the leakage rate value which the leakage circuit may provide to adjust the integration value may increase or decrease. The leakage circuit may be configured to provide the adjustment according to the mapping operation and/or transfer function of the integration value by adjusting the frequency of the oscillator signal, or adjusting the leakage rate as provided in this disclosure.

The oscillator controller 1160 may be configured to activate the triggerable oscillator 1165 in response to the trigger signal which the oscillator controller 1160 may receive when the spiking neuron operates at an initial mode, in which the integration value is at resting membrane potential value as disclosed above.

The triggerable oscillator 1165 may provide the oscillator signal including a signal oscillating at a certain frequency. The oscillator controller 1160 may provide a control signal to the triggerable oscillator 1165 to control the frequency of the oscillator signal which the oscillator generates. The oscillator controller 1160 may indicate a predefined frequency to the triggerable oscillator 1165 while the triggerable oscillator 1165 generates the oscillator signal. Furthermore, the oscillator controller 1160 may control the frequency of the oscillator signal based on the integration value. The oscillator controller 1160 may control the frequency of the oscillator signal based on the membrane potential value stored in the membrane potential accumulator 1140. The oscillator controller 1160 may control the frequency of the oscillator signal based on an indication received from a determiner 1170 of the spiking neuron. The oscillator controller 1160 may control the frequency of the oscillator signal based on a predefined mapping operation including an instance or a period of time. The oscillator controller 1160 may perform a predefined mapping operation based on the above-mentioned aspects to determine the frequency of the oscillator signal. Accordingly, the oscillator controller 1160 may provide a signal to the triggerable oscillator 1165 to indicate the determined frequency for the oscillator signal. Furthermore, the oscillator controller 1160 may receive information indicating the frequency of the oscillator signal. The triggerable oscillator 1165 may adjust the frequency to adjust the leakage value build-up.

Furthermore, the oscillator controller 1160 may receive an indication of a non-leaking operation. In response to a received indication of a non-leaking operation, the oscillator controller 1160 may deactivate the triggerable oscillator 1165. The oscillator controller 1160 may deactivate the triggerable oscillator 1165 in response to the indication of a non-leaking operation for a period of time. The oscillator controller 1160 may deactivate the triggerable oscillator 1165 in response to such indication until the spiking neuron fires. The oscillator controller 1160 may deactivate the triggerable oscillator 1165 in response to such indication until the oscillator controller 1160 receives an indication of a leaking operation.

The output of the triggerable oscillator 1165 may be coupled to one of the plurality of inputs 1101 of the spiking neuron, which may be referred to as a leaking input with respect to the spiking neuron provided in this drawing. The leaking input 1103 may include the same elements (i.e. same structure) with other inputs of the plurality of inputs 1101. The leaking input 1103 may include a pulse capturing element 1113 configured to provide an indication of a received input signal. For example, the pulse capturing element 1113 may be configured to detect received input signals with a threshold-based detection. The pulse capturing element 1113 may be configured to generate a received signal input indication indicating a detection of the oscillator signal for each positive (or negative) transition of the oscillator signal. The pulse capturing element 1113 may provide the generated indication to a leak releasing element 1123 that is similar to the weight releasing elements 1121, 1122, and to an OR logic 1151 and a pulse trigger circuit 1150 that are configured to receive outputs of the pulse capturing elements 1111, 1112.

Accordingly, the trigger circuit of the spiking neuron may provide received signal indication indicating a detection of an input signal from the inputs 1101, 1102, 1103, including the leak input 1103. Once the oscillator controller 1160 receives the trigger signal in response to a first received input spike signal when the integration value (and in this case the membrane potential value stored in the membrane potential accumulator 1140) is at the predefined resting membrane potential value, the oscillator controller 1160 may activate the triggerable oscillator 1165 to provide the oscillator signal to the leaking input 1103. Accordingly, the pulse trigger 1150 may provide the received signal indication for each oscillation of the oscillator signal.

The leak releasing element 1123 may include a memory storing a leak rate. The leak rate may include a leak value that may provide an opposite effect relative to the weight values which the weight releasing elements 1121, 1122 store for the respective inputs 1101, 1102. In other words, if the weight values stored by the weight releasing elements 1121, 1122 are of a positive value, the leak value may be negative. The weight releasing elements 1121, 1122 may be configured to provide an output in response to the trigger signal which the pulse trigger 1150 provides.

Furthermore, the spiking neuron may include a controller (not shown) that is configured to adjust the leak value stored in the leak releasing element 1123. The controller may adjust the leak value based on a predefined mapping operation or a transfer function. The controller may adjust the leak value based on the integration value. The controller may adjust the leak value based on the membrane potential value stored in the membrane potential accumulator 1140. The controller may adjust the leak value based on an indication received from the determiner 1170. The predefined mapping operation or the transfer function may include a parameter of time (e.g. instance of time or a period of time).

The controller may receive the integration value and perform a bit-shift operation to obtain the leak value. The controller may perform a bit-shift operation to obtain the leak value by accessing the membrane potential value stored in the membrane potential accumulator 1140. The controller may perform a predefined bit-shift operation (e.g. shift by one, shift by two) in response to the trigger signal or the oscillator signal to obtain the leak value based on the integration value or the stored membrane potential value including the sum of the integration value and the leakage value.

Furthermore, the controller may receive an indication of a non-leaking operation. In response to a received indication of a non-leaking operation, the controller may set the leak value to zero. The controller may set the leak value to zero in response to the indication of a non-leaking operation for a period of time. The controller may set the leak value to zero in response to such indication until the spiking neuron fires. The controller may set the leak value to zero in response to such indication until the controller receives an indication of a leaking operation.

For example, the spiking neuron may include a multiplexer 1180, and the leak releasing element 1123 may be configured to receive the output of the multiplexer 1180 as the leak value. One input of the multiplexer 1180 may be coupled to a component and/or a circuit 1181 that may receive the membrane potential value from the membrane potential accumulator 1140, perform a predefined mapping operation, and provide its output indicating the result of the predefined mapping operation to the one input of the multiplexer 1180. The component 1181 may include a component to perform a predefined bit-shifting operation, such as a shift-register, or a shifter circuit to perform a bit-shifting operation to the membrane potential value. The output of the multiplexer 1180 may be coupled to the leak releasing element 1123 to provide the output including a leak value based on the membrane potential value stored in the membrane potential accumulator 1140.

The multiplexer 1180 may further receive a predefined leakage rate value from one of its inputs 1182, and the multiplexer 1180 may further include a control input to receive a control signal in order to select an input which the multiplexer 1180 will provide to the leak releasing element 1123. When the multiplexer 1180 selects the input 1182, the output of the multiplexer 1180 may include the predefined leakage rate value, and accordingly, the leak value stored in the leak releasing element may be a fixed value equal to the predefined leakage rate value or based on the predefined leakage rate value. For example, there may be a further component (not shown) coupled to the input 1182, the component may be configured to receive the predefined leakage rate value, perform a predefined mapping operation (e.g. a bit-shifting operation), and provide its output to the input 1182 of the multiplexer. Accordingly, the output of the multiplexer 1180 may be based on the predefined leakage rate value and a predefined mapping operation. The bit-shifting operations may include an n-bit-shift and may be predefined according to a desired leakage function. The leak value may be referred to as "weight" in this disclosure for the rest of the operation of the spiking neuron.

The output of the weight releasing elements 1121, 1122, may include an indication of the determined weight for the respective input 1101, 1102 in response to the received signal input indication from the respective pulse capturing elements 1111, 1112. When one of the weight releasing elements 1121, 1122 does not receive the received signal input indication from the respective pulse capturing element 1111, 1112, the respective weight releasing element 1121, 1122 is configured not to provide an output, or provide an output including zero information for the respective input, in response to the trigger signal. In other words, the weight releasing elements 1121, 1122 are configured to provide the output indicating the determined weight for the respective input if the respective weight releasing element 1121, 1122 receives an indication from the pulse capturing element between two trigger signals.

The adder 1130 may receive the outputs of the weight releasing elements 1121, 1122 and the leak releasing element 1123 and perform the sum operation for the outputs of the weight releasing elements 1121, 1122 and the leak releasing element 1123 to provide the sum of the determined weights including the leakage value for each oscillation of the oscillator signal to the membrane potential accumulator 1140. The membrane potential value stored in the membrane potential accumulator 1140 may equal the sum of the integration value and the leakage value.

The spiking neuron may further include a determiner 1170. The determiner 1170 may determine activation or deactivation of the triggerable oscillator 1165. The determiner 1170 may determine to deactivate the triggerable oscillator 1165 based on the membrane potential value stored in the membrane potential accumulator 1140 including the sum of the integration value and the leakage value at an instance of time. The determiner 1170 may compare the membrane potential value with a leakage threshold (e.g. zero). The determiner 1170 may determine to deactivate the triggerable oscillator 1165 in case the membrane potential value stored in the membrane potential accumulator 1140 is less than (or equal to) the predefined leakage threshold (e.g. 0). Accordingly, the determiner 1170 may output a reset signal to indicate that the membrane threshold is less than (or equal to) the predefined leakage threshold.

Furthermore, the determiner 1170 may determine to deactivate the triggerable oscillator 1165 based on the membrane potential value stored in the membrane potential accumulator 1140 including the sum of the integration value and the leakage value at an instance of time. The determiner 1170 may compare the membrane potential value and a predefined membrane potential threshold value. The determiner 1170 may determine to deactivate the triggerable oscillator 1165 in case the membrane potential value is greater than (or equal to) the predefined membrane potential threshold value. In addition, the determiner 1170 may further determine to deactivate the triggerable oscillator 1165 in case the membrane potential value is less than the predefined resting membrane potential, for example, to disregard an inhibitory effect of a first input spike signal which the spiking neuron receives. Accordingly, the determiner 1170 may output a reset signal to provide the indication. Furthermore, the determiner 1170 may further output a firing indication to be provided to the pulse generation circuit 1175 which generates an output spike in response to the firing indication.

In response to a reset signal, the spiking neuron may switch its operation mode to the initial operation mode. The membrane potential accumulator 1140 may reset the membrane potential value to the predefined membrane resting potential value. The weight releasing elements 1121, 1122, and the leak releasing element 1123 may reset (or adjust based on a learning event) the weight values. The spiking neuron may include a delay circuit to provide a delay for a period of time between the respective determination of the determiner 1170 and the generation of the reset signal. Alternatively, a delay circuit may receive the reset signal to introduce a predefined delay for a refractory period. Furthermore, the oscillator controller 1160 may deactivate the triggerable oscillator 1165 in response to the reset signal.

Figure 12:
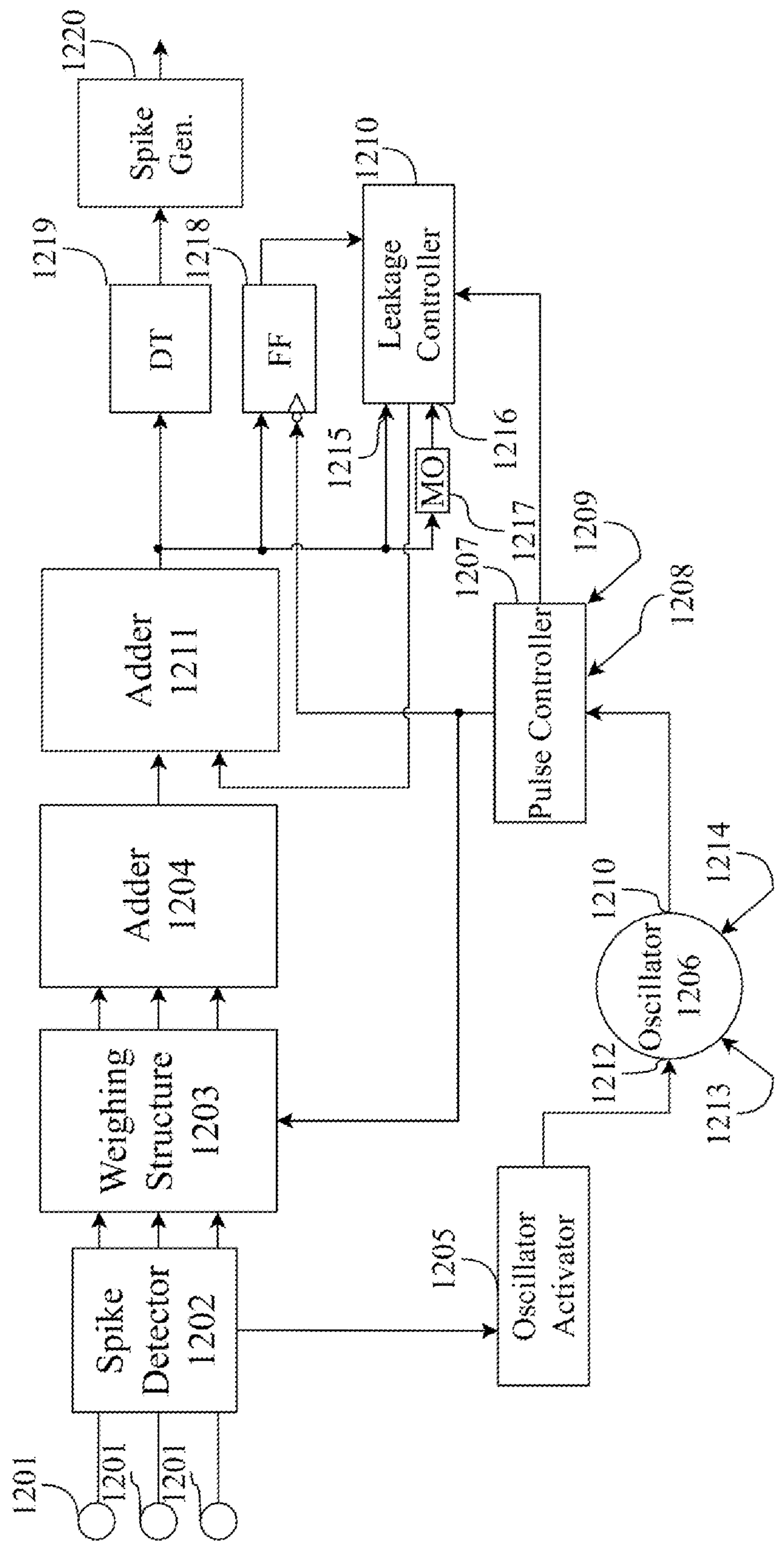
FIG. 12 shows schematically an example of a spiking neuron.

FIG. 12 shows schematically an example of a spiking neuron. The spiking neuron may include various functions of the spiking neuron with respect to FIG. 7, including a plurality of inputs 1201, a spike detector 1202 (e.g. plurality of pulse capturing elements, and a trigger circuit) configured to provide a received spike indication and a received spike input indication, a weighing structure 1203 (e.g. plurality of weight releasing elements), a first adder 1204, an oscillator activator 1205, and a triggerable oscillator 1206. The oscillator activator 1205 may receive the received spike indication (e.g. trigger signal) from the spike detector 1202 and activate or deactivate the triggerable oscillator 1206 to generate an oscillator signal. Furthermore, the weighing structure 1203 may provide the determined weights of received input spike signals to the first adder 1204 which outputs the sum of determined weights. The details of this operation have been provided with respect to FIG. 7.

The spiking neuron may further include a pulse controller 1207 coupled to the triggerable oscillator 1206 to receive the oscillator signal and configured to provide pulse signals from its output based on the oscillator signal. The pulse controller 1207 may receive a leakage frequency control signal from a leakage frequency input 1208 indicating a desired repetition frequency for the leakage function, and the pulse controller 1207 may output the pulse signals with a pulse repetition frequency indicated by the leakage frequency control signal. The pulse repetition frequency may be defined according to a desired leakage response during the design of the neural network. The pulse repetition frequency may be referred to as leakage frequency in this disclosure. Furthermore, the pulse controller 1207 may receive a leakage control signal from a leakage enable input 1209, and the pulse controller 1207 may provide an indication to a leakage controller 1210 based on the leakage enable input to activate or deactivate the leakage controller 1210.

In response to a received input spike signal, the oscillator activator 1205 may receive the trigger signal and the oscillator activator 1205 may activate the triggerable oscillator 1206 by providing a signal to a trigger input 1212 of the triggerable oscillator 1206. Accordingly, the triggerable oscillator 1206 may provide the oscillator signal from the output 1210 to the pulse controller 1207. In other words, the triggerable oscillator 1206 may begin providing the oscillator signal from the output 1210 when the triggerable oscillator 1206 receives an indication from the oscillator activator 1205 via the trigger input 1209. The triggerable oscillator 1206 may be a triggerable ring oscillator. The triggerable oscillator 1206 may provide the oscillator signal until the oscillator activator 1205 deactivates the triggerable oscillator 1206 in response to a reset signal.

The triggerable oscillator 1206 may further include a frequency control input 1214 that is configured to receive an indication to control the frequency of the oscillator signal which the triggerable oscillator 1206 generates. The triggerable oscillator 1206 may further include a disable input 1212 to receive an indication to deactivate the triggerable oscillator 1206. When the oscillator activator 1205 receives a reset signal, the oscillator activator 1205 may deactivate the triggerable oscillator 1206.

The pulse controller 1207 may provide the pulse signals to the weighing structure 1203 in order to trigger the weighing structure 1203 to release the determined weights for the inputs based on received input spike signals. The weighing structure 1203 may provide the weight values for the inputs which have received an input spike signal to the first adder 1204. The first adder 1204 may output the sum of the weight values to the leakage adder 1211.

Furthermore, the spiking neuron may include a leakage controller 1210. The leakage controller 1210 may be configured to output a leakage value. The output of the leakage controller 1210 may be coupled to the leakage adder 1211, and accordingly, the leakage adder 1211 may perform a sum operation for a first input which the leakage adder 1211 receives from the first adder 1204, and for a second input which the leakage adder 1211 receives from the leakage controller. In other words, the leakage adder 1211 may output a sum of the weight values and the leakage value.

The leakage controller 1210 may provide the leakage value for a second instance of time-based on the output of the leakage adder 1211 at a first instance of time, wherein the second instance of time occurs after the first instance of time. The leakage controller 1210 may receive the output of the leakage adder 1211 as an input at a first instance of time from a first input 1215. A first pulse that the pulse controller 1207 provides may indicate the first instance of time. The leakage controller 1210 may receive the output of the leakage adder 1211 at the first instance of time and adjust the output of the leakage adder 1211 based on a predefined mapping operation or a transfer function. The leakage controller 1210 may provide the adjusted output of the leakage adder 1211 to the second input of the leakage adder 1211. Accordingly, at a second instance of time, the leakage adder 1211 may provide an output including a sum of the weight values which the leakage adder 1211 receives from the first adder 1204 at a second instance of time and the adjusted output of the leakage adder 1211 based on the output of the leakage adder 1211 at the first instance of time. A second pulse that the pulse controller 1207 may provide after the first pulse may indicate the first instance of time. Accordingly, the output of the leakage adder 1211 may represent a membrane potential value of the spiking neuron at an instance of time, which the membrane potential value may include the sum of the leakage value and the integration value. As indicated, a pulse signal which the pulse controller 1207 may provide may define the instance of time (e.g. via a negative transition of each pulse signal, a positive transition of each pulse signal, etc.).

The leakage controller 1210 may adjust the output of the leakage adder 1211 at the first instance, and for each further instance of time, linearly. The leakage controller 1210 may adjust the output of the leakage adder 1211 at the first instance by adjusting the output with a predefined leakage rate value for each instance of time. The leakage controller 1210 may decrease (perform a subtraction) the output of the leakage adder 1211 for each instance of time by the predefined leakage rate value.

The leakage controller 1210 may adjust the output of the leakage adder 1211 at the first instance, and for each further instance of time, in a non-linear fashion. The leakage controller 1210 may adjust the output of the leakage adder 1211 based on a predefined mapping operation. The leakage controller 1210 may perform the mapping operation based on the output of the leakage adder 1211.

The spiking neuron may include a logic 1217 to perform the mapping operation. The mapping operation may provide the adjustment with a binary scaling, such as a bit-shift operation. Exemplarily, the logic 1217 may include a shift register, or a shifter circuit to perform the mapping operation. The logic 1217 may be coupled to a second input of the leakage controller 1210. The leakage controller 1210 may receive the output of the first adder 1211 at a first instance of time, and the logic 1217 may also receive the output of the first adder 1211 at the first instance of time. The logic 1217 may provide a logic output based on the mapping operation. The leakage controller 1210 may provide an output to the leakage adder 1211 based on the output of the first adder 1211 at the first instance of time, and the logic output. The spiking neuron may further include a logic 1218 (e.g. a flip-flop logic) coupled to the adder, and the logic 1218 may be configured to provide an indication to the leakage controller 1210 based on a presence of an output of the leakage adder 1211. The leakage controller 1210 may perform the adjustment based on the indication provided by the logic 1218.

Furthermore, the leakage controller 1210 may receive the indication from the pulse controller 1207 based on the leakage enable input of the pulse controller 1207 to activate or deactivate the leakage function of the leakage controller 1210. In response to the indication to deactivate the leakage function, the leakage controller 1210 may provide the output of the leakage adder 1211 at the first instance back to the leakage adder 1211 at the second instance of time if there is an input to the leakage adder 1211 from the first adder 1204 at the second instance of time. The leakage controller 1210 may provide no output to the leakage adder 1211 at the second instance of time if there is an input to the leakage adder 1211 at the second instance of time.

The oscillator activator 1205 may include a controller to control the pulse repetition frequency of the pulse controller 1207. The controller of the oscillator activator 1205 may control the pulse repetition frequency of the pulse controller 1207 based on the output of the leakage adder 1211. The controller of the oscillator activator 1205 may control the pulse controller 1207 to adjust the pulse repetition frequency of the pulse controller 1207 based on the output of the leakage adder 1211. In one example, the leakage adder 1211 and the first adder 1204 may be implemented as one adder, and accordingly, an input of the one adder may be coupled to the output of the weighing structure 1203 and another input of the one adder may be coupled to the output of the leakage controller 1210, similarly to the leakage adder 1211.

The spiking neuron may further include a determiner 1219. The determiner 1219 may determine activation or deactivation of the triggerable oscillator 1206. The determiner 1219 may determine to deactivate the triggerable oscillator 1206 based on the output of the leakage adder 1211 at an instance of time. The determiner 1219 may compare the output of the leakage adder 1211 with a leakage threshold (e.g. zero). The determiner 1219 may determine to deactivate the triggerable oscillator 1206 in case the output of the first adder 1211 is less than (or equal to) the predefined leakage threshold (e.g. 0). Accordingly, the determiner 1219 may output a reset signal to indicate that the output of the leakage adder 1211 is less than (or equal to) the predefined leakage threshold.

Furthermore, the determiner 1219 may determine to deactivate the triggerable oscillator 1206 based on the output of the leakage adder 1211 at an instance of time. The determiner 1219 may compare the output of the leakage adder 1211 and a predefined membrane potential threshold value. The determiner 1219 may determine to deactivate the triggerable oscillator 1206 in case the output of the leakage adder 1211 is greater than (or equal to) the predefined membrane potential threshold value. In addition, the determiner 1219 may further determine to deactivate the triggerable oscillator 1206 in case the output of the leakage adder 1211 is less than the predefined resting membrane potential, for example, to disregard an inhibitory effect of a first input spike signal which the spiking neuron receives. Accordingly, the determiner 1219 may output a reset signal to provide the indication. Furthermore, the determiner 1219 may further output a firing indication to be provided to the spike generation circuit 1220 which generates an output spike in response to the firing indication.

In response to a reset signal, the spiking neuron may switch its operation mode to the initial operation mode. The leakage controller 1210 (and the logic 1218) may reset. The weighing structure 1203 may reset (or adjust based on a learning event) the weight values. The spiking neuron may include a delay circuit to provide a delay for a period of time between the respective determination of the determiner 1219 and the generation of the reset signal. Alternatively, a delay circuit may receive the reset signal to introduce a predefined delay for a refractory period. Furthermore, the oscillator activator 1205 may deactivate the triggerable oscillator 1206 in response to the reset signal.

Figure 13:
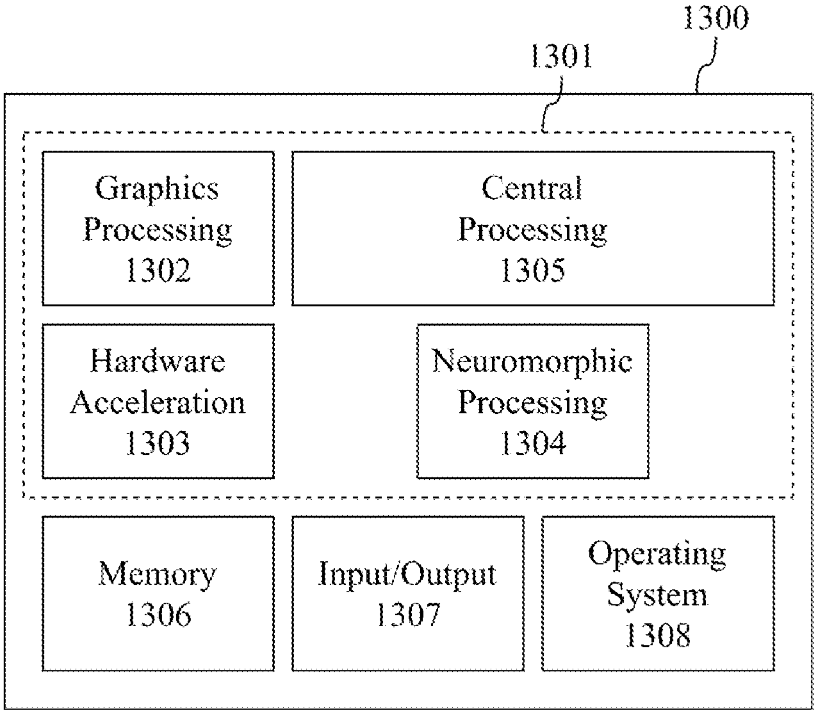
FIG. 13 shows schematically an example of a computing system.

FIG. 13 shows schematically an example of a computing system. The computing system 1300 may be implemented by another system or device, for example, a computer e.g. a desktop computer or a tablet computer, a mobile device, a mobile communication device e.g. a mobile terminal or a smartphone, a wearable device e.g. a smart watch or a smart googles, a device for a smart home (domotics), an internet of things (IoT) device, a vehicle computer e.g. an autonomous vehicle or an automated and/or assisted driving vehicle, an edge device, etc.

The computing system 1300 may include components which may include hardware components and/or software components. The computing system may include one or more processors 1301, e.g. a graphics processing unit 1302, a hardware acceleration unit 1303, a neuromorphic processing unit 1304, and a central processing unit 1305. The one or more processors 1301 may be implemented in one processing unit, e.g. a system on chip (SOC), or a processor.

The graphics processing unit 1302 may include a processing unit (or one or more processors) that is configured to process input data and alter data in a memory in a relatively efficient manner with algorithms and functions that are directed towards computer graphics and image processing. The graphics processing unit 1302 may include a general-purpose graphics processing unit (GPGPU) which may be further configured to process input data that may be related to non-graphical operations as well.

The hardware acceleration unit 1303 may include one or more processors that are configured to provide efficient processing that is directed to predefined tasks in a specialized manner. The hardware acceleration unit 1303 may include certain functions that are directed to predefined tasks. The hardware acceleration unit 1303 may include, for example, a field-programmable gate array (FPGA) directed to one or more tasks, one or more application-specific integrated circuits (ASIC), a deep learning processor (DLP), a deep learning accelerator, a neural processing unit, an artificial intelligence (AI) processor, a graphics processing unit, a vision processing unit, etc.

The neuromorphic processing unit 1304 may include a plurality of neuron circuits as provided in this disclosure to form a neural network. The neural network may include a spiking neural network. The neuromorphic processing unit 1304 may include a plurality of neuromorphic cores.

Each of the neuromorphic cores may include one or more neuron circuits. The neuromorphic cores may be coupled to each other in a network configuration such as a mesh configuration, a ring configuration, etc. The neuromorphic cores may be configured to transmit and receive spikes to each other in the network configuration. Similar to the operation of the neurons as provided in this disclosure, a neuromorphic core may be configured to provide an output spike(s) for the neuron circuits which the neuromorphic core includes when the spikes which the neuromorphic core receives from other neuromorphic cores accumulate for a period of time and reach to a neuromorphic core threshold.

The neuromorphic processing unit 1304 may include one or more learning engines that are configured to provide a learning function. The one or more learning engines may be configured to adjust synaptic weight elements to provide the learning function based on iterations. A memory may include the synaptic weight elements for each of the neuron circuits, and a learning engine may be configured to adjust the synaptic weight elements of each of the neuron circuits stored in the memory. The one or more learning engines may be configured to adjust membrane thresholds of the neuron circuits to provide the learning function based on iterations. A memory may include the membrane potential threshold value for each of the neuron circuits, and a learning engine may be configured to adjust the membrane potential threshold value of each of the neuron circuits stored in the memory. The learning engine may be configured to provide an adjustment to a resting membrane potential of a neuron circuit, and/or an initial leakage value of a neuron circuit, and/or a leakage increment value of a neuron circuit with a similar operation in order to provide the learning function. The learning engines may be configured to provide an adjustment as exemplarily disclosed above, after observing outcomes for a period of time which may be referred to as "learning epoch" for the neuron circuits. Each of the plurality of neuromorphic cores may include a learning engine that is configured to provide the learning function for the neuron circuits which the respective neuromorphic core includes.

The neuromorphic processing unit 1304 may include a memory (not shown) to provide storage with respect to various functions of the neuromorphic processing unit 1304 (e.g. storing operating parameters of neuron circuits, such as synaptic weight elements, membrane thresholds, etc.). The neuromorphic processing unit 1304 may be configured to perform in-memory processing. The neuromorphic processing unit 1304 may be coupled to the memory 1306 of the computing system 1300. The neuromorphic processing unit 1304 may include a controller that is configured to perform various functions to control the operation of the neuromorphic processing unit 1304. The neuromorphic processing unit 1304 may further be configured to receive control instructions from the central processing unit 1305 or any one of the one or more processors 1301 of the computing system 1300. The neuromorphic processing unit 1304 may include one or more routers to provide communication between the neuromorphic cores.

The computing system 1300 may further include an input/output unit 1307. The input/output unit 1307 may include an interface to receive input data from an input component and/or device. The interface may be configured to provide output data to an output component and/or device. The input/output unit 1307 may further include an output component and/or device, such as a display, and/or a touchscreen display, and/or a loudspeaker, and/or a haptic output, and/or an output port that is configured to provide an output to further components and/or devices. The input/output unit 1307 may further include an input component and/or device, such as a keyboard, and/or a touchscreen display which may be the same touchscreen display used as the output component, and/or a touch panel, and/or a touch pad, and/or a mouse, and/or an input port that is configured to receive an input from further components and/or devices.

The input/output unit 1307 may further include a communication circuit, e.g. a radio communication circuit or a wired communication circuit, that is configured to communicate with other components and/or devices. The communication circuit may include a transmitter to transmit communication signals. The communication circuit may include a receiver to receive communication signals.

The computing system 1300 may further include an operating system 1308. The operating system 1308 may be configured to provide an interface between any of the hardware and software resources of the computing system 1300. The operating system 1308 may be further configured to provide an interface between any of the hardware and software resources and a user via a user interface. The computing system 1300 may further include the memory 1308 to store any type of data, and the operating system 1308 may further be configured to perform memory management for the memory 1308.

Figure 14:
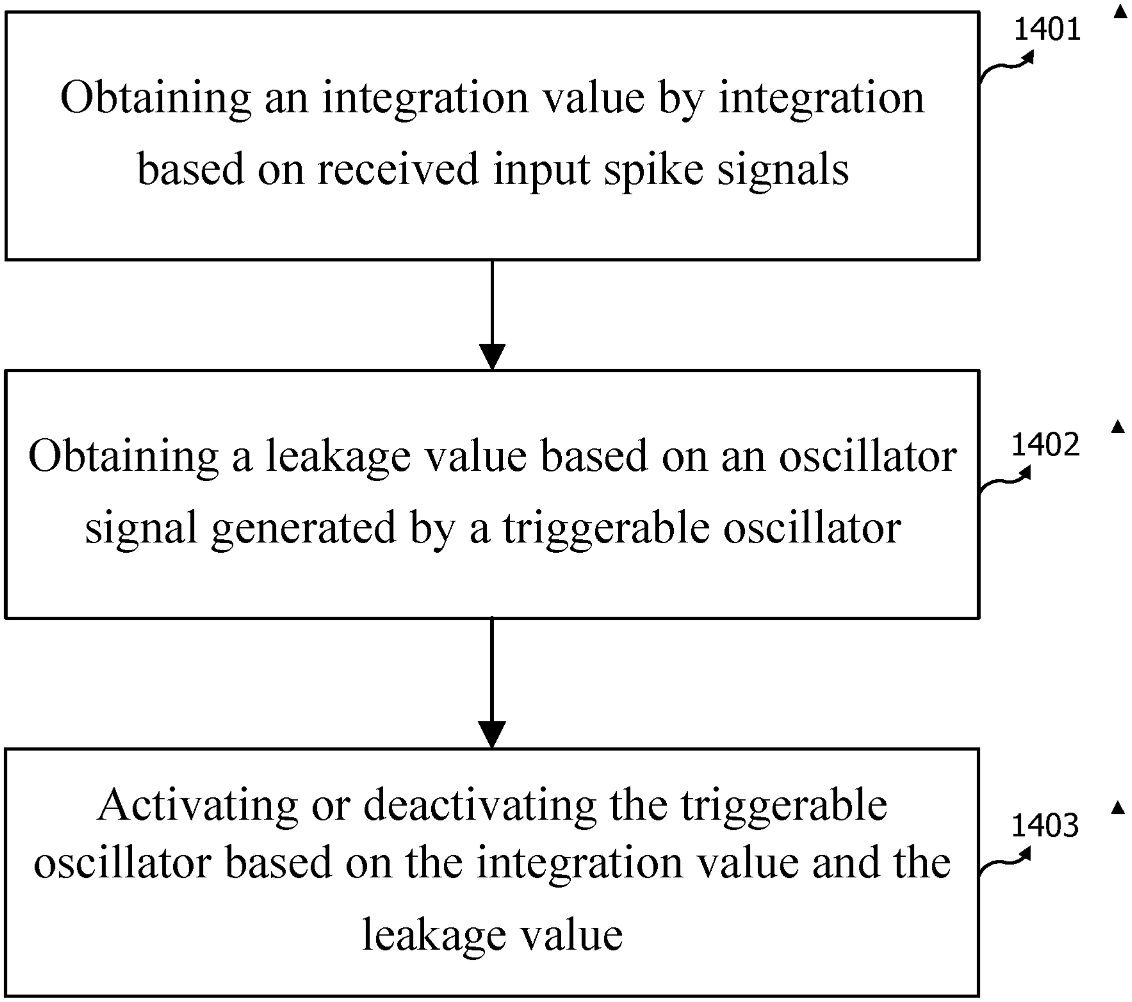
FIG. 14 shows schematically an example of a method.

FIG. 14 shows schematically an example of a method. The method may include obtaining 1401 an integration value by integration based on received input spike signals, obtaining 1402 a leakage value based on an oscillator signal generated by a triggerable oscillator, activating or deactivating 1403 the triggerable oscillator based on the integration value and the leakage value. In an example, a non-transitory computer-readable medium may store instructions that may be executed by a processor, to cause the processor to perform the method.

The following examples pertain to further aspects of this disclosure.

Example 1 includes a subject matter of a spiking neuron, may further include: a triggerable oscillator configured to generate an oscillator signal; a circuit configured to obtain an integration value based on received input spike signals; a leakage circuit configured to obtain a leakage value based on the oscillator signal; an oscillator activator configured to activate or deactivate the triggerable oscillator based on the leakage value and the integration value.

In example 2, the subject matter of example 1, may further include that the oscillator activator is further configured to activate or deactivate the triggerable oscillator based on the integration value and a predefined threshold. In example 3, the subject matter of example 1 or example 2, may further include a trigger circuit configured to provide a trigger signal based on a detection of received input spike signals, may further include that the oscillator activator is further configured to activate or deactivate the triggerable oscillator based on the trigger signal. In example 4, the subject matter of example 3, may further include that the circuit is further configured to adjust the integration value in response to the trigger signal.

In example 5, the subject matter of any one of examples 3 or 4, may further include that the oscillator activator is further configured to activate the triggerable oscillator in response to the trigger signal. In example 6, the subject matter of any one of examples 2 to 5, may further include a determiner configured to reset the integration value to a predefined initial integration value based on the leakage value and the integration value. In example 7, the subject matter of any one of examples 2 to 6, may further include that the determiner is further configured to reset the integration value to a predefined initial integration value based on the integration value and the predefined threshold.

In example 8, the subject matter of any one of examples 2 to 7, may further include that the determiner is further configured to reset the leakage value to a predefined initial leakage value based on the leakage value and the integration value. In example 9, the subject matter of any one of examples 2 to 8, may further include that the determiner is further configured to reset the leakage value to a predefined initial leakage value based on the integration value and the predefined threshold. In example 10, the subject matter of any one of examples 2 to 9, may further include that the determiner is further configured to provide an indication to generate an output spike based on the integration value and the predefined threshold.

In example 11, the subject matter of example 10, may further include a spike generator configured to generate an output spike based on the indication to generate the output spike. In example 12, the subject matter of any one of examples 1 to 11, may further include that the triggerable oscillator includes a frequency controllable triggerable oscillator. In example 13, the subject matter of any one of examples 1 to 12, can optionally include that the triggerable oscillator includes an input to receive a frequency control signal, can optionally include that the triggerable oscillator is further configured to adjust the frequency of the oscillator signal based on the frequency control signal, can optionally include that the frequency of the oscillator is adjusted based on at least one of the following, the integration value or the leakage value.

In example 14, the subject matter of any one of examples 6 to 13, can optionally include that the determiner is configured to generate a reset signal, can optionally include that the oscillator activator includes an input to receive the reset signal to activate or deactivate the triggerable oscillator. In example 15, the subject matter of example 14, can optionally include that once the oscillator activator has activated the triggerable oscillator, the triggerable oscillator operates until the oscillator activator deactivates the triggerable oscillator in response to the reset signal.

In example 16, the subject matter of any one of examples 3 to 15, can optionally include that the oscillator activator includes an input to receive the trigger signal to activate or deactivate the triggerable oscillator. In example 17, the subject matter of example 16, can optionally include that once the oscillator activator has received the reset signal and deactivated the triggerable oscillator, the oscillator activator is further configured to activate the triggerable oscillator when the oscillator activator receives the trigger signal. In example 18, the subject matter of any one of examples 1 to 17, further may include: an input spike signal detector configured to detect input spike signals received from a plurality of inputs.

In example 19, the subject matter of any one of examples 1 to 18, further may include: a weighing structure configured to output determined weights based on the received input spike signals from a plurality of inputs. In example 20, the subject matter of example 19, can optionally include that the weighing structure is configured to output the determined weights in response to the trigger signal. In example 21, the subject matter of example 20, can optionally include that the circuit includes an adder configured to sum the determined weights received from the weighing structure. In example 22, the subject matter of example 21, can optionally include that the weighing structure further includes a memory configured to store a weight value for each of the plurality of inputs, can optionally include that the weighing structure is further configured to output the determined weights may include the weight values for inputs based on the received input spike signals, can optionally include that the adder is further configured to sum the weight values received from the weighing structure.

In example 23, the subject matter of example 22, can optionally include that the weighing structure includes a plurality of weight releasing elements, can optionally include that each of the plurality of weight releasing elements is coupled to one of the plurality of inputs, can optionally include that each weight releasing element includes a memory to store the weight value of the input which the respective weight releasing element is coupled to. In example 24, the subject matter of example 23, can optionally include that each weight releasing element is configured to output the weight value in response to the trigger signal.

In example 25, the subject matter of any one of examples 20 to 24, can optionally include that the circuit includes a membrane potential circuit configured to perform a predefined mapping operation in response to the trigger signal. In example 26, the subject matter of any one of examples 20 to 25, can optionally include that the membrane potential circuit is further configured to receive the determined weights from the weighing structure, can optionally include that the membrane potential circuit is further configured to perform the predefined mapping operation with the determined weights to obtain the integration value.

In example 27, the subject matter of example 25 or example 26, can optionally include that the membrane potential circuit includes a membrane potential accumulator may include a memory to store the integration value, can optionally include that the membrane potential accumulator is configured to accumulate the sum of the determined weights. In example 28, the subject matter of example 27, can optionally include that the membrane potential accumulator is further configured to accumulate each of the received sum of the determined weights in response to the trigger signal.

In example 29, the subject matter of example 27 or example 28, can optionally include that the membrane potential accumulator is further configured to reset the integration value to a predefined initial integration value in response to an indication from the determiner or an indication from the oscillator activator. In example 30, the subject matter of example 29, can optionally include that the membrane potential accumulator is further configured to reset the integration value after a predefined period of time in response to the indication. In example 31, the subject matter of example 30, can optionally include that the leakage circuit includes a memory to store the leakage value, can optionally include that the leakage circuit is further configured to adjust the leakage value in response to the oscillator signal.

In example 32, the subject matter of example 31, can optionally include that the leakage circuit is further configured to adjust the leakage value with each oscillation of the oscillator signal. In example 33, the subject matter of example 30 or example 31, can optionally include that the leakage circuit includes a determiner configured to generate a reset signal based on the leakage value and the integration value in response to the trigger signal. In example 34, the subject matter of any one of examples 31 to 33, can optionally include that the leakage circuit includes a leakage counter to store the leakage value; can optionally include that the leakage counter is configured to receive the oscillator signal and increase the leakage counter based on the oscillator signal.

In example 35, the subject matter of any one of examples 31 to 33, can optionally include that the leakage circuit includes a leakage accumulator to store the leakage value; can optionally include that the leakage accumulator is further configured to accumulate based on the oscillator signal. In example 36, the subject matter of example 35, can optionally include that the leakage accumulator is further configured to accumulate the leakage value by increasing the leakage value with a predefined leakage rate value. In example 37, the subject matter of example 36, can optionally include that the leakage accumulator is further configured to accumulate the leakage value by increasing an actual leakage value with the predefined leakage rate value in response to the oscillator signal.

In example 38, the subject matter of any one of examples 35 to 37, can optionally include that the leakage accumulator is an edge-triggered leakage accumulator, and optionally a negative edge-triggered accumulator. In example 39, the subject matter of any one of examples 21 to 24, can optionally include that the leakage circuit is coupled to an output of the adder configured to provide the sum of the determined weights, can optionally include that the leakage circuit is further configured to provide an adjustment to the sum of the determined weights.

In example 40, the subject matter of example 39, can optionally include that the leakage circuit includes a leakage adder coupled to the adder, can optionally include that the leakage adder is configured to receive a first input may further include the output of the adder, and a second input, can optionally include that the leakage adder is further configured to provide a sum of the first input and the second input from an output, can optionally include that the leakage circuit is further configured to adjust the output of the leakage adder with a scaling factor and provide the adjusted output as the second input to the leakage adder. In example 41, the subject matter of example 40, can optionally include that the leakage circuit is further configured to adjust the output of the leakage adder by a bit-shifting operation.

In example 42, the subject matter of example 41, can optionally include that the leakage circuit is further configured to adjust the output of the leakage adder based on a predefined leakage rate value. In example 43, the subject matter of example 42, can optionally include that the leakage circuit is further configured to adjust the output of the leakage adder with the scaling factor based on the first input. In example 44, the subject matter of any one of examples 21 to 24, can optionally include that the leakage circuit coupled to an input of the adder of the circuit, can optionally include that the leakage circuit is configured to provide a predefined leakage rate value to the input of the adder in response to the oscillator signal.

In example 45, the subject matter of example 44, can optionally include that the leakage predefined leakage rate value includes a negative value, can optionally include that the triggerable oscillator is further configured to provide the oscillator signal to an input of the trigger circuit. In example 46, the subject matter of any one of examples 1 to 45, further may include a controller configured to control the frequency of the oscillator signal based on at least one of the integration value and the leakage value.

In example 47, the subject matter of example 46, can optionally include that the controller is further configured to control the frequency of the oscillator signal based on the predefined membrane potential threshold. In example 48, the subject matter of example 46 or example 47, can optionally include that the controller is further configured to generate a control signal to adjust the frequency of the oscillator signal.

In example 49, a subject matter may include a method that may include: obtaining an integration value by integration based on received input spike signals; obtaining a leakage value based on an oscillator signal generated by a triggerable oscillator; activating or deactivating the triggerable oscillator based on the integration value and the leakage value.

In example 50, the subject matter of example 49, may include activating or deactivating the triggerable oscillator based on the integration value and a predefined threshold. In example 51, the subject matter of example 49 or example 50, further may include providing a trigger signal based on a detection of received input spike signals, activating or deactivating the triggerable oscillator based on the trigger signal. In example 52, the subject matter of example 52, may include adjusting the integration value in response to the trigger signal. In example 53, the subject matter of any one of examples 51 or 52, can optionally include that the oscillator activator is further configured to activate the triggerable oscillator in response to the trigger signal.

In example 54, the subject matter of any one of examples 49 to 53, may include resetting the integration value to a predefined initial integration value based on the leakage value and the integration value. In example 55, the subject matter of any one of examples 49 to 54, may include resetting the integration value to a predefined initial integration value based on the integration value and the predefined threshold. In example 56, the subject matter of any one of examples 49 to 55, may include resetting the leakage value to a predefined initial leakage value based on the leakage value and the integration value.

In example 57, the subject matter of any one of examples 49 to 56, may include resetting the leakage value to a predefined initial leakage value based on the integration value and the predefined threshold. In example 58, the subject matter of any one of examples 49 to 57, may further include providing an indication to generate an output spike based on the integration value and the predefined threshold. In example 59, the subject matter of example 58, further may include generating an output spike based on the indication to generate the output spike. In example 60, the subject matter of any one of examples 48 to 59, can optionally include that the triggerable oscillator includes a frequency controllable triggerable oscillator.

In example 61, the subject matter of any one of examples 48 to 60, may further include adjusting the frequency of the oscillator signal based on the frequency control signal based on at least one of the following, the integration value or the leakage value. In example 62, the subject matter of any one of examples 53 to 61, may further include generating a reset signal by a determiner, receiving the reset signal, by an oscillator activator, to activate or deactivate the triggerable oscillator. In example 63, the subject matter of example 62, may further include operating the triggerable oscillator until the oscillator activator deactivates the triggerable oscillator in response to the reset signal once the oscillator activator has activated the triggerable oscillator.

In example 64, the subject matter of example 63, may further include activating the triggerable oscillator when the oscillator activator receives the trigger signal once the oscillator activator has received the reset signal and deactivated the triggerable oscillator. In example 65, the subject matter of any one of examples 48 to 64, further may include: detecting input spike signals received from a plurality of inputs. In example 66, the subject matter of any one of examples 48 to 65, further may include: outputting determined weights based on the received input spike signals from a plurality of inputs.

In example 67, the subject matter of example 66, may further include outputting the determined weights in response to the trigger signal. In example 68, the subject matter of example 67, may further include summing the determined weights received from the weighing structure. In example 69, the subject matter of example 68, may further include outputting, by a weighing structure, the determined weights may include weight values for inputs based on the received input spike signals, summing the weight values received from the weighing structure. In example 70, the subject matter of example 69, may further include outputting the weight values in response to the trigger signal.

In example 71, the subject matter of any one of examples 68 to 70, may further include performing a predefined mapping operation in response to the trigger signal. In example 72, the subject matter of any one of examples 69 to 71, may further include receiving the determined weights from the weighing structure, performing the predefined mapping operation with the determined weights to obtain the integration value. In example 73, the subject matter of example 71 or example 72, may further include accumulating the sum of the determined weights. In example 74, the subject matter of example 73, may further include accumulating each of the received sum of the determined weights in response to the trigger signal.

In example 75, the subject matter of example 73 or example 74, may further include resetting the integration value to a predefined initial integration value in response to an indication from the determiner or an indication from the oscillator activator. In example 76, the subject matter of example 75, may further include resetting the integration value after a predefined period of time in response to the indication. In example 77, the subject matter of example 76, may further include adjusting the leakage value in response to the oscillator signal. In example 78, the subject matter of example 77, may further include adjusting the leakage value with each oscillation of the oscillator signal.

In example 79, the subject matter of example 76 or example 77, may further include generating a reset signal based on the leakage value and the integration value in response to the trigger signal. In example 80, the subject matter of any one of examples 77 to 79, may further include increasing a leakage counter based on the oscillator signal. In example 81, the subject matter of any one of examples 77 to 80, may further include accumulating the leakage value based on the oscillator signal.

In example 82, the subject matter of example 81, may further include accumulating the leakage value by increasing the leakage value with a predefined leakage rate value. In example 83, the subject matter of example 82, may further include accumulating the leakage value by increasing an actual leakage value with the predefined leakage rate value in response to the oscillator signal. In example 84, the subject matter of any one of examples 72 to 76, may further include providing, from an adder, the sum of the determined weights, providing an adjustment to the sum of the determined weights. In example 85, the subject matter of example 84, may further include receiving, by a leakage adder, a first input may further include the output of the adder, and a second input, providing a sum of the first input and the second input from an output, adjusting the output of the leakage adder with a scaling factor and providing the adjusted output as the second input to the leakage adder.

In example 86, the subject matter of example 85, may further include adjusting the output of the leakage adder by a bit-shifting operation. In example 87, the subject matter of example 86, may further include adjusting the output of the leakage adder based on a predefined leakage rate value. In example 88, the subject matter of example of example 87, can optionally include that the leakage circuit is further configured to adjust the output of the leakage adder with the scaling factor based on the first input.

In example 89, the subject matter of any one of examples 72 to 76, may further include providing a predefined leakage rate value to an input of an adder in response to the oscillator signal. In example 90, the subject matter of example 89, can optionally include that the leakage predefined leakage rate value includes a negative value, providing the oscillator signal to an input of the trigger circuit. In example 91, the subject matter of any one of examples 48 to 90, may further include controlling the frequency of the oscillator signal based on at least one of the integration value and the leakage value. In example 92, the subject matter of example 91, may further include controlling the frequency of the oscillator signal based on a predefined membrane potential threshold. In example 93, the subject matter of example 91 or example 92, may further include generating a control signal to adjust the frequency of the oscillator signal.

In example 94—A spiking neuron may include: a triggerable oscillator configured to generate an oscillator signal; a circuit configured to obtain an integration value by integrating based on received input spike signals; a leakage circuit configured to obtain a leakage value based on the oscillator signal; an oscillator activator configured to activate the triggerable oscillator in response to a received input spike signal.

In example 95—A spiking neuron may include: a triggerable oscillator for generating an oscillator signal; a circuit for obtaining an integration value based on received input spike signals; a leakage circuit for obtaining a leakage value based on the oscillator signal; an oscillator activator for activating or deactivating the triggerable oscillating means based on the leakage value and the integration value. In example 96, a processor may include a plurality of spiking neurons according to any one of the examples 1 to 48, or capable to perform methods with a plurality of spiking neurons according to any one of examples 49 to 92.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A spiking neuron, comprising:

a triggerable ring oscillator configured to generate an oscillator signal;

a circuit comprising an adder and a membrane potential accumulator, wherein the circuit is configured to obtain an integration value based on received input spike signals from one or more pre-synaptic neurons, wherein the membrane potential accumulator is configured to store the integration value;

a leakage circuit comprising a leakage accumulator, wherein the leakage circuit is configured to obtain a leakage value based on the oscillator signal, and wherein the leakage accumulator is configured to accumulate and store the leakage value in response to the oscillator signal;

an oscillator activator comprising a comparator, wherein the oscillator activator is configured to activate or deactivate the triggerable ring oscillator based on the leakage value and the integration value, wherein the oscillator activator is configured to deactivate the triggerable ring oscillator when the leakage value stored in the leakage accumulator is greater than or equal to the integration value stored in the membrane potential accumulator.

2. The spiking neuron of claim 1, further comprising a trigger circuit comprising a pulse trigger, wherein the trigger circuit is configured to provide a trigger signal based on a detection of received input spike signals, wherein the oscillator activator is further configured to activate or deactivate the triggerable ring oscillator based on the trigger signal.

3. The spiking neuron of claim 2, wherein the circuit is further configured to adjust the integration value in response to the trigger signal, and wherein the oscillator activator is further configured to activate the triggerable ring oscillator in response to the trigger signal.

4. The spiking neuron of claim 2, further comprising a determiner comprising a comparator, wherein the determiner is configured to reset the integration value to a predefined initial integration value based on the leakage value and the integration value, wherein the determiner is further configured to reset the integration value to the predefined initial integration value based on the integration value and a predefined threshold, wherein the determiner is further configured to reset the leakage value to a predefined initial leakage value based on the leakage value and the integration value, and wherein the determiner is further configured to reset the leakage value to a predefined initial leakage value based on the integration value and the predefined threshold.

5. The spiking neuron of claim 4, wherein the determiner is further configured to provide an indication to generate an output spike based on the integration value and the predefined threshold, and wherein the spiking neuron further comprises a spike generator configured to generate an output spike based on the indication to generate the output spike.

6. The spiking neuron of claim 4, wherein the determiner is configured to generate a reset signal, wherein the oscillator activator comprises an input to receive the reset signal to activate or deactivate the triggerable ring oscillator, wherein once the oscillator activator has activated the triggerable ring oscillator, the triggerable ring oscillator operates until the oscillator activator deactivates the triggerable ring oscillator in response to the reset signal.

7. The spiking neuron of claim 6, wherein the oscillator activator comprises an input to receive the trigger signal to activate or deactivate the triggerable ring oscillator, and wherein once the oscillator activator has received the reset signal and deactivated the triggerable ring oscillator, the oscillator activator is further configured to activate the triggerable ring oscillator when the oscillator activator receives the trigger signal.

8. The spiking neuron of claim 1, wherein the triggerable ring oscillator comprises a frequency controllable triggerable oscillator, wherein the triggerable ring oscillator comprises an input to receive a frequency control signal to adjust the frequency of the oscillator signal, and wherein the triggerable ring oscillator is further configured to adjust the frequency of the oscillator signal based on the frequency control signal.

9. The spiking neuron of claim 8, further comprising a controller to generate a control signal to adjust the frequency of the oscillator signal based on one of the leakage value and the integration value.

10. The spiking neuron of claim 1, further comprising:

a weighing structure configured to output determined weights based on the received input spike signals from a plurality of inputs, wherein the weighing structure is configured to output the determined weights in response to a trigger signal.

11. The spiking neuron of claim 10, wherein the weighing structure further comprises a memory configured to store a weight value for each of the plurality of inputs, wherein the weighing structure is further configured to output the determined weights comprising the weight values for inputs based on the received input spike signals, and wherein the spiking neuron further comprises an adder configured to sum the weight values received from the weighing structure.

12. The spiking neuron of claim 11, wherein the circuit comprises a membrane potential circuit configured to receive the determined weights from the weighing structure, wherein the membrane potential circuit is further configured to perform a predefined mapping operation with the determined weights to obtain the integration value.

13. The spiking neuron of claim 12, wherein the membrane potential accumulator is configured to accumulate a sum of the determined weights in response to the trigger signal.

14. The spiking neuron of claim 1, wherein the leakage accumulator is further configured to accumulate the leakage value by increasing the leakage value with a predefined leakage rate value.

15. The spiking neuron of claim 12, wherein the leakage circuit is coupled to an output of the adder configured to provide the sum of the determined weights, and wherein the leakage circuit is further configured to provide an adjustment to a sum of the determined weights.

16. The spiking neuron of claim 15, wherein the leakage circuit comprises a leakage adder coupled to the adder, wherein the leakage adder is configured to receive a first input including the output of the adder, and a second input, wherein the leakage adder is further configured to provide a sum of the first input and the second input from an output, and wherein the leakage circuit is further configured to adjust the output of the leakage adder with a scaling factor and provide the adjusted output as the second input to the leakage adder.

17. The spiking neuron of claim 16, wherein the leakage circuit is further configured to adjust the output of the leakage adder with at least one of the following a bit-shifting operation, based on a predefined leakage rate value, and with the scaling factor based on the first input.

18. The spiking neuron of claim 12, wherein the leakage circuit is coupled to an input of the adder of the circuit, and wherein the leakage circuit is configured to provide a predefined leakage rate value to the input of the adder in response to the oscillator signal.

19. A method comprising:

obtaining an integration value by integration based on received input spike signals from one or more pre-synaptic neurons;

storing the integration value in a membrane potential accumulator;

obtaining a leakage value based on an oscillator signal generated by a triggerable ring oscillator by accumulating and storing the leakage value in a leakage accumulator;

comparing the integration value stored in the membrane potential accumulator with the leakage value stored in the leakage accumulator; and deactivating the triggerable ring oscillator based on the comparison of the integration value and the leakage value, wherein the deactivating comprises deactivating the triggerable ring oscillator when the leakage value is greater than or equal to the integration value.

20. The method of claim 19, further comprising:

generating a trigger signal based on a detection of received input spike signals;

activating or deactivating the triggerable ring oscillator in response to a first trigger signal.

21. A spiking neuron comprising:

a triggerable ring oscillator configured to generate an oscillator signal;

a circuit comprising an adder and a membrane potential accumulator, wherein the circuit is configured to obtain an integration value by integrating based on received input spike signals from one or more pre-synaptic neurons, and wherein the membrane potential accumulator is configured to store the integration value;

a leakage circuit comprising a leakage accumulator, wherein the leakage circuit is configured to obtain a leakage value based on the oscillator signal, and wherein the leakage accumulator is configured to accumulate and store the leakage value in response to the oscillator signal;

an oscillator activator comprising a comparator, wherein the oscillator activator is configured to activate the triggerable ring oscillator in response to a received input spike signal, and wherein the comparator is configured to compare the integration value stored in the membrane potential accumulator with the leakage value stored in the leakage accumulator, and wherein the oscillator is further configured to deactivate the triggerable ring oscillator when the leakage value is greater than or equal to the integration value.

22. The spiking neuron of claim 21, wherein the triggerable ring oscillator comprises a frequency controllable triggerable oscillator, wherein the spiking neuron further comprises a controller to generate a control signal to adjust the frequency of the oscillator signal based on at least one of the leakage value and the integration value.

23. A spiking neuron comprising:

a triggerable oscillator means for generating an oscillator signal;

a circuit means for obtaining an integration value based on received input spike signals from one or more pre-synaptic neurons and for storing the integration value;

a leakage circuit means for obtaining a leakage value based on the oscillator signal and for accumulating and storing the leakage value;

an oscillator activator means for activating or deactivating the triggerable oscillator means based on the leakage value and the integration value, wherein the oscillator activator means comprises means for comparing the stored integration value with the stored leakage value and for deactivating the triggerable oscillator means when the leakage value is greater than or equal to the integration value.

24. The spiking neuron of claim 23, wherein the triggerable oscillator means comprises a frequency controllable triggerable oscillator, wherein the spiking neuron further comprises a controller to generate a control signal to adjust the frequency of the oscillator signal based on at least one of the leakage value and the integration value.

* * * * *